(12) United States Patent
Bert

(10) Patent No.: US 12,050,945 B2
(45) Date of Patent: Jul. 30, 2024

(54) STORAGE PRODUCTS WITH CONNECTORS TO OPERATE EXTERNAL NETWORK INTERFACES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 186 days.

(21) Appl. No.: 17/866,341

(22) Filed: Jul. 15, 2022

(65) Prior Publication Data

US 2024/0020182 A1    Jan. 18, 2024

(51) Int. Cl.
*G06F 9/54*    (2006.01)
*G06F 13/16*    (2006.01)

(52) U.S. Cl.
CPC .......... *G06F 9/546* (2013.01); *G06F 13/1668* (2013.01)

(58) Field of Classification Search
CPC .............................. G06F 9/546; G06F 13/1668
See application file for complete search history.

(56) References Cited

U.S. PATENT DOCUMENTS

| | | | |
|---|---|---|---|
| 6,766,359 B1 | 7/2004 | Oliveira et al. | |
| 9,432,484 B1 | 8/2016 | Xie et al. | |
| 9,514,080 B1 | 12/2016 | Chang | |
| 9,537,953 B1 | 1/2017 | Dadashikelayeh et al. | |
| 10,664,217 B1 | 5/2020 | Laha et al. | |
| 10,984,044 B1 | 4/2021 | Batsakis et al. | |
| 11,106,734 B1 | 8/2021 | Batsakis et al. | |
| 11,410,475 B2 | 8/2022 | Golov | |
| 11,436,194 B1 | 9/2022 | Salmon et al. | |
| 11,650,868 B2 | 5/2023 | Jha et al. | |

(Continued)

FOREIGN PATENT DOCUMENTS

WO    2023020055    2/2023

OTHER PUBLICATIONS

Data Storage Devices having Different Paths for Control Messages and Data Messages, U.S. Appl. No. 17/866,276, filed Jul. 15, 2022, 8786, Luca Bert, Non Final Action Mailed.

(Continued)

*Primary Examiner* — Tuan C Dao
(74) *Attorney, Agent, or Firm* — Greenberg Traurig

(57) ABSTRACT

A standalone storage product having: a first bus connector for connecting to an external processor; a second bus connector for connecting to an external network interface; a storage device accessible over the network interface; and a processing device configured to communicate, via the second bus connector, with the network interface to obtain storage access messages represented by incoming packets received at the network interface from a computer network. The processing device can: identify, from the storage access messages, first messages and second messages; provide, the first messages via the first bus connector, to the processor; and provide, the second messages, to the storage device without the second messages going through the processor. The storage device is configured to: receive, via the first bus connector, third messages from the processor; and execute commands in the second messages and the third messages to implement a network storage service.

20 Claims, 12 Drawing Sheets

(56) References Cited

U.S. PATENT DOCUMENTS

| | | |
|---|---|---|
| 11,733,931 B1 | 8/2023 | Wu et al. |
| 11,775,225 B1 | 10/2023 | Bert |
| 11,809,361 B1 | 11/2023 | Bert |
| 11,853,819 B1 | 12/2023 | Bert |
| 11,868,827 B1 | 1/2024 | Bert |
| 11,868,828 B1 | 1/2024 | Bert |
| 2005/0240745 A1 | 10/2005 | Tyer et al. |
| 2006/0026229 A1 | 2/2006 | Ari et al. |
| 2006/0185015 A1* | 8/2006 | Cheston ............ G06F 21/56 726/24 |
| 2008/0228897 A1* | 9/2008 | Ko .................... H04L 67/1097 709/213 |
| 2008/0320233 A1 | 12/2008 | Kinter |
| 2010/0005234 A1 | 1/2010 | Ganga et al. |
| 2010/0095073 A1 | 4/2010 | Caulkins |
| 2010/0106889 A1 | 4/2010 | Manning |
| 2010/0274971 A1 | 10/2010 | Solihin |
| 2011/0246823 A1 | 10/2011 | Khan et al. |
| 2012/0030408 A1* | 2/2012 | Flynn ................ G06F 11/1471 711/E12.001 |
| 2012/0278396 A1 | 11/2012 | Vuong |
| 2012/0311271 A1 | 12/2012 | Klein et al. |
| 2013/0097369 A1* | 4/2013 | Talagala ........... G06F 12/0804 711/103 |
| 2014/0282613 A1 | 9/2014 | Jea et al. |
| 2017/0288867 A1 | 10/2017 | Collier et al. |
| 2017/0344430 A1 | 11/2017 | Greer et al. |
| 2018/0141750 A1 | 5/2018 | Hasegawa et al. |
| 2018/0217951 A1 | 8/2018 | Benisty et al. |
| 2018/0349487 A1 | 12/2018 | Garg et al. |
| 2019/0042501 A1 | 2/2019 | Trika |
| 2019/0044879 A1 | 2/2019 | Richardson et al. |
| 2019/0095107 A1 | 3/2019 | Wysoczanski et al. |
| 2019/0340024 A1 | 11/2019 | Brewer |
| 2020/0065018 A1 | 2/2020 | Hong |
| 2020/0117520 A1 | 4/2020 | Costa et al. |
| 2020/0186445 A1 | 6/2020 | Govindaraju et al. |
| 2020/0226077 A1 | 7/2020 | Kang et al. |
| 2021/0303424 A1 | 9/2021 | Jain |
| 2022/0004668 A1 | 1/2022 | Dewan et al. |
| 2022/0121587 A1 | 4/2022 | Kragel et al. |
| 2022/0137835 A1* | 5/2022 | Malakapalli ........ G06F 9/30029 714/6.22 |
| 2022/0188028 A1 | 6/2022 | Mesnier et al. |
| 2022/0236902 A1 | 7/2022 | Pinto et al. |
| 2022/0245082 A1 | 8/2022 | Vijayashekar et al. |
| 2022/0300207 A1 | 9/2022 | Tsuji et al. |
| 2022/0405015 A1 | 12/2022 | Lee et al. |
| 2023/0029616 A1 | 2/2023 | Pandit et al. |
| 2023/0037870 A1 | 2/2023 | Jones |
| 2023/0088291 A1 | 3/2023 | Tsuji et al. |
| 2023/0127200 A1 | 4/2023 | Glimcher et al. |
| 2023/0214333 A1 | 7/2023 | Glimcher et al. |
| 2024/0020011 A1 | 1/2024 | Bert |
| 2024/0020029 A1 | 1/2024 | Bert |
| 2024/0020046 A1 | 1/2024 | Bert |
| 2024/0020047 A1 | 1/2024 | Bert |
| 2024/0020048 A1 | 1/2024 | Bert |
| 2024/0020049 A1 | 1/2024 | Bert |
| 2024/0020051 A1 | 1/2024 | Bert |
| 2024/0020062 A1 | 1/2024 | Bert |
| 2024/0020181 A1 | 1/2024 | Bert |
| 2024/0020183 A1 | 1/2024 | Bert |
| 2024/0020184 A1 | 1/2024 | Bert |
| 2024/0022526 A1 | 1/2024 | Bert |
| 2024/0022645 A1 | 1/2024 | Bert |
| 2024/0028546 A1 | 1/2024 | Bert |

OTHER PUBLICATIONS

Data Storage Devices with Reduced Buffering for Storage Access Messages, U.S. Appl. No. 17/866,300, filed Jul. 15, 2022, 5835, Nov. 7, 2023, Luca Bert, Notice of Allowance Mailed—Application Received in Office of Publications.

Message Queue Configuraiton to Separate Processing Paths for Control Messages and Data Messages, U.S. Appl. No. 17/866,318, filed Jul. 15, 2022, 9315, Aug. 24, 2022, Luca Bert, Docketed New Case—Ready for Examination.

Messages Queues in Network-Ready Storage Products having Computational Storage Processors, U.S. Appl. No. 17/866,339, filed Jul. 15, 2022, 4919, Dec. 6, 2023, Luca Bert, Patented Case.

Message Queues in Network-Ready Storage Products having Computational Storage Processors, U.S. Appl. No. 18/502,713, filed Nov. 6, 2023, 2997, Nov. 21, 2023, Luca Bert, Docketed New Case—Ready for Examination.

Network Data Storage Devices having External Access Control, U.S. Appl. No. 17/866,349, filed Jul. 15, 2022, 3270, Oct. 18, 2023, Luca Bert, Patented Case.

Network Data Storage Devices having External Access Control, U.S. Appl. No. 18/481,047, filed Oct. 4, 2023, 7133, Oct. 23, 2023, Luca Bert, Docketed New Case—Ready for Examination.

Selective Message Processing by External Processors for Network Data Storage Devices, U.S. Appl. No. 17/866,353, filed Jul. 15, 2022, 4972, Sep. 13, 2023, Luca Bert, Patented Case.

Selective Message Processing by External Processors for Network Data Storage Devices, U.S. Appl. No. 18/458,956, filed Aug. 30, 2023, 6893, Luca Bert, Docket New Case—Ready for Examination.

Message Routing in a Network-Ready Storage Product for Internal and External Processing, U.S. Appl. No. 17/866,357, filed Jul. 15, 2022, 8420, Dec. 20, 2023, Luca Bert, Patented Case.

Message Routing in a Network-Ready Storage Product for Internal and External Processing, U.S. Appl. No. 18/544,806, filed Dec. 19, 2023, 2132, Jan. 4, 2024, Luca Bert, Docketed New Case—Ready for Examination.

Network Storage Services Implemented via Storage Products and External Software, U.S. Appl. No. 17/866,358, filed Jul. 15, 2022, 5228, Nov. 29, 2023, Luca Bert, Response to Non-Final Office Action Entered and Forwarded to Examiner.

External Data Processing for Networked-Ready Storage Products having Computational Storage Processors, U.S. Appl. No. 17/866,355, filed Jul. 15, 2022, 1045, Luca Bert, Ex-parte Quayle Action Mailed.

Network Storage Products with Options for External Processing, U.S. Appl. No. 17/866,350, filed Jul. 15, 2022, 4294, Dec. 20, 2023, Luca Bert, Patent Case.

Network Storage Products with Options for External Processing, U.S. Appl. No. 18/392,457, Dec. 21, 2023, 6158, Dec. 21, 2023, Luca Bert, Application Undergoing Preexam Processing.

Network-Ready Storage Products for Implementations of Internet Appliances, U.S. Appl. No. 17/866,348, filed Jul. 15, 2022, 9884, Aug. 24, 2022, Luca Bert, Docketed New Case—Ready Examination.

Network-Ready Storage Products with Computational Storage Processors, U.S. Appl. No. 17/866,336, filed Jul. 15, 2022, 7401, Jan. 8, 2024, Luca Bert, Notice of Allowance Mailed—Application Received in Office of Publications.

Network-Ready Storage Products with Artificial Intelligence Accelerators, U.S. Appl. No. 17/866,333, filed Jul. 15, 2022, 4702, Aug. 22, 2022, Luca Bert, Docketed New Case—Ready for Examination.

Network-Ready Storage Products with Cryptography based Access Control, U.S. Appl. No. 17/866,312, filed Jul. 15, 2022, 2914, Nov. 14, 2023, Luca Bert, Non Final Action Mailed.

Data Storage Devices having Different Paths for Control Messages and Data Messages, U.S. Appl. No. 17/866,276, filed Jul. 15, 2022, 8786, Aug. 22, 2022, Luca Bert, Docketed New Case—Ready for Examination.

Data Storage Devices with Reduced Buffering for Storage Access Messages, U.S. Appl. No. 17/866,300, filed Juuuul.l 15, 2022, 5835, Aug. 23, 2022, Luca Bert, Docketed New Case—Ready for Examination.

Message Queue Configuration to Separate Processing Paths for Control Messages and Data Messages, U.S. Appl. No. 17/866,318, filed Jul. 15, 2022, Aug. 24, 2022, Luca Bert, Docketed New Case—Ready for Examination.

(56) References Cited

OTHER PUBLICATIONS

Message Queues in Network-Ready Storage Products having Computational Storage Processors, U.S. Appl. No. Jul. 15, 2022, 4919, Sep. 21, 2023, Luca Bert, Notice of Allowance Mailed—Application Received in Office of Publications.

Network Data Storage Devices having External Acccess Control, U.S. Appl. No. 17/866,349, filed Jul. 15, 2022, 3270, Sep. 25, 2023, Luca Bert, Awaiting TC Resp, Issue Fee Payment Verified.

Selective Message Processing by External Processors for Network Data Storage Deevices, U.S. Appl. No. 18/458,956, filed Aug. 30, 2023, 6893, Sep. 12, 2023, Luca Bert, Docketed New Case—Ready for Examination.

Message Routing in a Networkk-Ready Storage Product for Internal and External Processing, U.Ss. Appl. No. 17/866,357, filed Jul. 15, 2022, 8420, Aug. 23, 2023, Luca Bert, Notice of Allowance Mailed—applicaaaation Received in Office of Publications.

Network Storage Services Implemented via Storage Products and External Software, U.S. Appl. No. 17/866,358, filed Jul. 15, 2022, 5228, Aug. 17, 2023, Luca Bert, Non Final Action Mailed.

External Data Processing for Network-Ready Storage eProducts having Computational Storage Processors, U.s. Appl. No. 17/866,355, filed Jul. 15, 2022, 1045, Oct. 4, 2022, Luca Bert, Docketed New Case—Ready for Examination.

Network Storage Products with Options for External Processing, U.S. Appl. No. 17/866,350, filed Jul. 15, 2022, 4294, Aug. 24, 2023, Luca Bert, Notice of Allowance Mailed—Application Received in Office of Publications.

Network-Ready Storage Products for Implementations of Internet Appliances, U.S. Appl. No. 17/866,348, filed Jul. 15, 2022, 9884, Aug. 24, 2022, Luca Bert, Docketed New Case—Ready for Examination.

Network-Ready Storage Products with Computational Storage Processors, U.S. Appl. No. 17/866,336, filed Jul. 15, 2022, 7401, Aug. 22, 2022, Luca Bert, Docketed New Case—Ready for Examination.

Network-Ready Storage Products with Artificial Intelligence Accelerator, U.S. Appl. No. 17/866,333, filed Jul. 15, 2022, 4702, Aug. 22, 2022, Luca Bert, Docketed New Case—Ready for Examination.

Networked-Ready Storage Products with Crytography based Access Control, U.S. Appl. No. 17/866,312, 2914, Aug. 22, 2022, Luca Bert, Docketed New Case—Ready for Examination.

* cited by examiner

STORAGE PRODUCTS WITH CONNECTORS TO OPERATE EXTERNAL NETWORK INTERFACES

TECHNICAL FIELD

At least some embodiments disclosed herein relate to memory systems in general, and more particularly, but not limited to memory systems configured to service data access requests received over computer networks.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
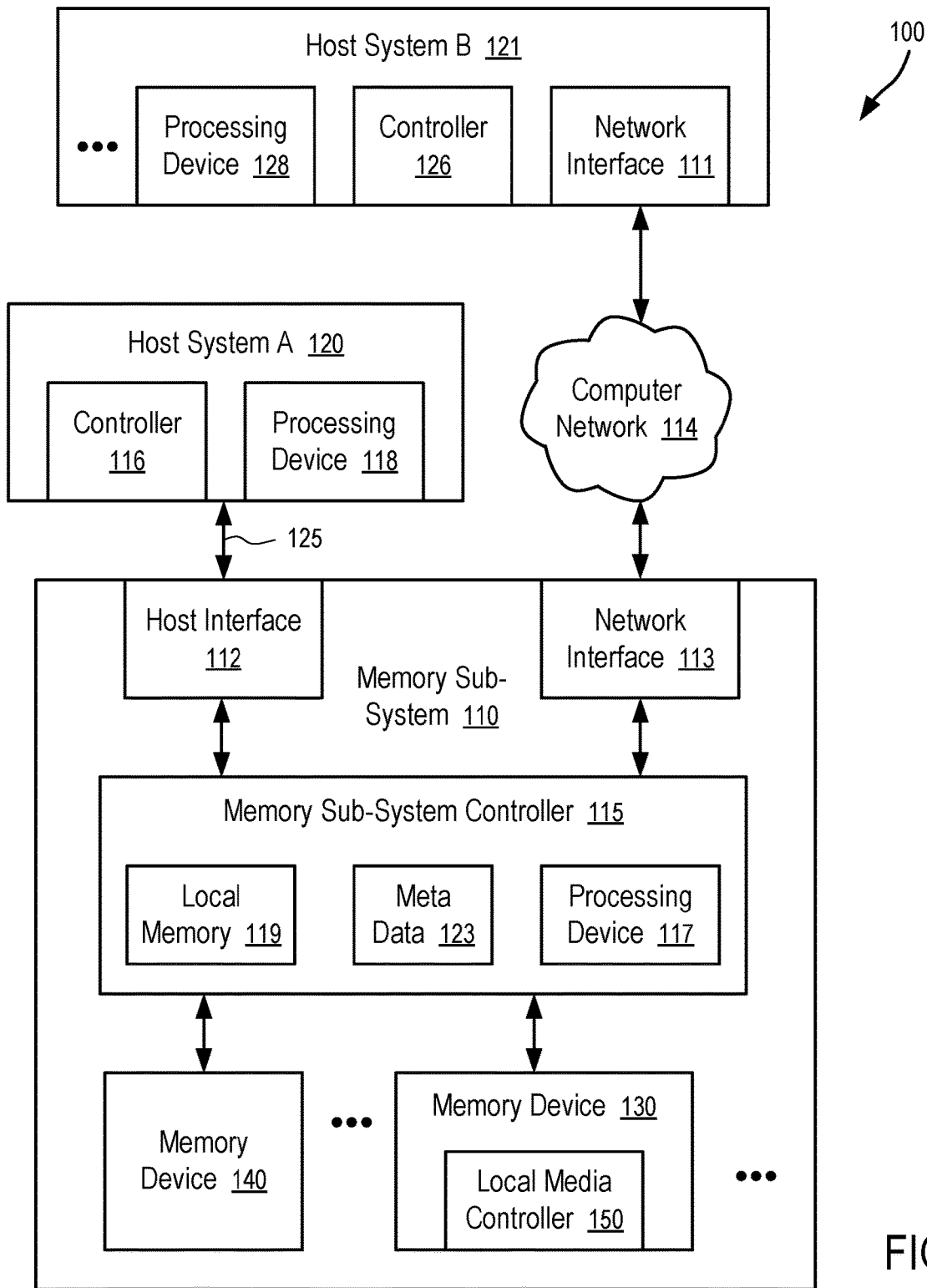
FIG. 1 illustrates an example computing system having a memory sub-system in accordance with some embodiments of the present disclosure.

At least some aspects of the present disclosure are directed to a memory sub-system configured with different processing paths for control messages and data messages. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional network-attached storage device is typically configured as a computing device having a central processing unit (CPU), a random-access memory, a network interface, and one or more memory devices to provide a storage capacity accessible over a computer network. The CPU is typically configured to run an operating system and/or a storage application to provide storage services in response to communications received in the network interface. Communications received in the network interface from a remote host system can include control messages and data messages. The messages are generated by the remote host system to manage and/or access the storage capacity of the network-attached storage device. The instructions executed in the CPU can be programmed to process the control messages and the data messages as input from the remote host system. In response to the messages, the CPU is configured via the instructions to authenticate users, manage access privileges and security settings, authorize access, manage the storage capacity, store data into the memory devices, retrieve data from the memory devices, etc.

For example, the control messages and the data messages received via the network interface of the conventional network-attached storage device are buffered in the random-access memory. The CPU is configured to fetch the messages, process the messages, and send corresponding messages to a local storage device, such as a solid-state drive. The solid-state drive can receive messages, execute the commands in the messages to store data, retrieve data from the memory devices, send retrieved data to the CPU, etc. The CPU can send the retrieved data to the network interface for transmission through a computer network to the remote host system.

Thus, in the conventional network-attached storage device, messages received in the network interface, including control messages and data messages, flow from the network interface through the CPU towards the storage capacity. Access responses, such as data retrieved in response to the read requests/commands, flow through the CPU for transmission by the network interface into the computer network.

However, it is inefficient to flow data messages through the CPU; and the CPU can be a bottleneck in processing power and communication bandwidth in scaling up storage capacity.

At least some aspects of the present disclosure address the above and other deficiencies by using different processing paths for control messages and data messages.

For example, a computing device providing network storage services can be configured with a storage device (e.g., a solid-state drive (SSD), a flash memory device, a ball grid array (BGA) SSD), a processing device (e.g., a microprocessor, a CPU), and a network interface connected to a remote host system as a storage client. The storage client (e.g., the network interface receiving messages from the remote host system) can write data into the storage device and retrieve data from the storage device. The storage client is configured to provide data messages to the storage device without going through the processing device. Control messages, such as administrative commands and management commands, are routed through the processing device. Instructions executed in the processing device are configured/programmed to process the control messages to exercise access control, to exercise security control, and to perform administrative operations.

For example, to reduce the burden on the CPU and improve efficiency, the computing device can be configured with different processing paths for certain control messages and other messages.

For example, the control messages on a separate processing path can include administrative and management commands used to create a namespace in the storage capacity, to map the namespace to a client, to authenticate users, to set security attributes (e.g., read only permitted vs. both read and write permitted), to provide authorization to which operation is allowed, to manage configuration changes, etc. Such control messages (e.g., for administrative and management functions) can be configured to flow through the processing device; and the processing device is configured via programmed instructions and/or other data to process the control message. Instructions executed in the processing device can be programmed to perform access control, administrative operations, management operations, etc., without operating on the data to be stored into and/or the data being retrieved from the storage device. Other messages, such as data messages containing write commands and data to be written into the storage device according to the write commands, read commands, data retrieved in response to the read commands, etc., can be configured to be communicated between the storage device and the storage client without going through the processing device.

As a result, the power consumption of the computing device can be reduced; the requirement on the communication bandwidth through the processing device (e.g., a microprocessor, a CPU) can be reduced; and the requirement on the computing power on the processing device can be reduced.

In contrast, a traditional network-attached storage device is configured to flow data messages through a CPU. In typical usages, administrative and management commands are only a small portion of messages, the data messages can be the majority of the messages going through in the network interface. Thus, the processing of the data messages by the CPU in the traditional network-attached storage device can place a very high weight on the CPU (e.g., lot of commands to process) and the random-access memory (e.g., lot of data buffering).

When data messages are communicated from a storage client to a storage device without going through the processing device (e.g., a microprocessor, a CPU) of the computing device, according to the present disclosure, the processing device is tasked to process a very small portion of messages (e.g., administrative and management commands, which are less than 0.1% of total commands). Other messages (e.g., more than 99.99% of total commands), including both command parts and data parts, can be routed to the storage device without going through the processing device. As a result, a less powerful processing device can be used to control and manage the storage; and the storage capacity can be easily scaled up by the processing device controlling multiple units, each containing a network interface and one or more local storage devices, as further discussed below.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 140), one or more non-volatile memory devices (e.g., memory device 130), or a combination of such.

In FIG. 1, the memory sub-system 110 is configured as a product of manufacture, usable as a component installed in a computing device. The memory sub-system 110 has a network interface 113 controlled by a memory sub-system controller 115 to communicate with a remote host system 121 over a computer network 114.

For example, the remote host system 121 can be configured with a processing device 128 (e.g., a microprocessor, a CPU), a memory controller 126, a network interface 111, and other components (e.g., random-access memory, sensors, and/or user interfaces). Instructions executed in the processing device 128 can be programmed to use the network interface 111 to access the storage capacity of the memory sub-system 110 using a storage protocol, such as internet small computer systems interface (iSCSI), fibre channel (FC), fibre channel over ethernet (FCoE), network file system (NFS), and server message block (SMB), or another protocol.

The memory sub-system 110 further includes a host interface 112 for a computer memory bus or a computer peripheral bus 125 connectable to a local host system 120 having a memory controller 116 and a processing device 118.

For example, instructions executed in the local host system 120 can be programmed to control, through the bus 125, the memory sub-system 110 according to serial advanced technology attachment (SATA), peripheral component interconnect express (PCIe), universal serial bus (USB), fibre channel (FC), serial attached SCSI (SAS), double data rate (DDR), small computer system interface (SCSI), open NAND flash interface, low power double data rate (LPDDR), non-volatile memory (NVM) express (NVMe), compute express link (CXL), or another technique.

Thus, a combination of the local host system 120 and the memory sub-system 110 can be used as a network-attached data storage device providing storage services to the remote host system 121 through the network interface 113 using a storage capacity of the memory devices 130, . . . , 140.

For example, the processing device 118 can be a microprocessor configured as a CPU of a computing device functioning a network-attached data storage device. The local host system 120 can be connected to one or more of the memory sub-systems (e.g., 110) via a peripheral bus 125. To scale up the storage capacity of the network-attached data storage device, more memory sub-systems (e.g., 110) can be connected to the local host system 120, with their respective network interfaces (e.g., 113) being connected to the computer network 114 and/or other computer networks.

Although FIG. 1 illustrates an example of one remote host system 121 connected to the network interface 113, multiple remote host systems (e.g., 121) can be configured on the computer network 114 to access the storage services of the network-attached storage device. Access to the storage services can be controlled via user credentials, host attributes, network addresses, and/or security settings, etc.

To reduce the burden on the local host system 120, at least a portion of control messages, among the messages received via the network interface 113 from the computer network 114 (e.g., from the remote host system 121), can be separated in the memory sub-system 110 from other types of messages, such as data messages. The memory sub-system 110 is configured to provide the control messages through the host interface 112 to the local host system 120 for processing without providing other messages, such as data messages, to the host interface 112, as discussed further below.

For example, network packets received in the network interface 113 can be processed by the memory sub-system controller 115 to recover or generate control messages and data messages. The memory sub-system controller 115 can include local memory 119 (e.g., random-access memory) and a processing device 117 configured to at least process the network packets from the network interface 113. The memory sub-system controller 115 can buffer the control messages in the local memory 119 for processing by the local host system 120; and the local host system 120 can place processing results in the local memory 119 for execution. The execution of the control messages processed by the local host system 120 can generate meta data 123 that control the storage operations performed for data messages. The controller 115 can be configured to execute the commands of the data messages based on the meta 123 to store data into the memory devices 130, ..., 140, to retrieve data from the memory devices 130, ..., 140, and to transmit the retrieved data to the remote host system 121 using the network interface 113.

In some implementations, a memory device 130 can be a solid-state drive (e.g., a BGA SSD). Thus, the memory sub-system controller 115 can process and/or forward commands as processed by the local host system 120 and other commands to operate the memory device 130.

In some implementations, a portion of the memory sub-system controller 115 and at least a portion of the memory devices 130, ..., 140 are configured as a conventional storage device (e.g., SSD); and a remaining portion of the memory sub-system controller 115 can forward commands to the storage device for execution. Thus, a conventional storage device (e.g., SSD) can be used as a component or a local storage device in implementation of the memory sub-system 110.

In some implementations, multiple portions of the memory sub-system controller 115 and the memory devices 130, ..., 140 can be configured as multiple conventional storage devices (e.g., SSDs). In other implementations, the processing device 117 is shared by the memory devices 130, ..., 140 without being configured according to a conventional storage device (e.g., SSD). Thus, the configuration of the memory sub-system controller 115 and memory devices 130, ..., 140 are not limited to a particular connectivity and/or topology.

Bypassing the local host system 120 in the processing of the data messages greatly reduces the workloads of the local host system 120. Thus, the local host system 120 can be used to control multiple memory sub-systems (e.g., 110) in expanding storage capacity.

Since the memory sub-system 110, as a product, is configured to specifically service the storage access requests received via the network interface 113, the processing and communication bandwidth within the memory sub-system 110 can be designed and tailored according to the communication bandwidth of the network interface 113. Products similar to the memory sub-system 110 can be used as building blocks of a network storage facility controlled by the local host system 120. The capacity of the network storage facility can be easily scaled up via connecting more units to the computer network 114. Since the workload of the local host system 120 and communications to the local host system 120 are very low for controlling each memory sub-system 110, many memory sub-systems (e.g., 110) can be connected to the local host system 120 to scale up the capacity of the network storage facility without being limited by the communication bandwidth and/or processing power of an available local host system 120.

Figure 2:
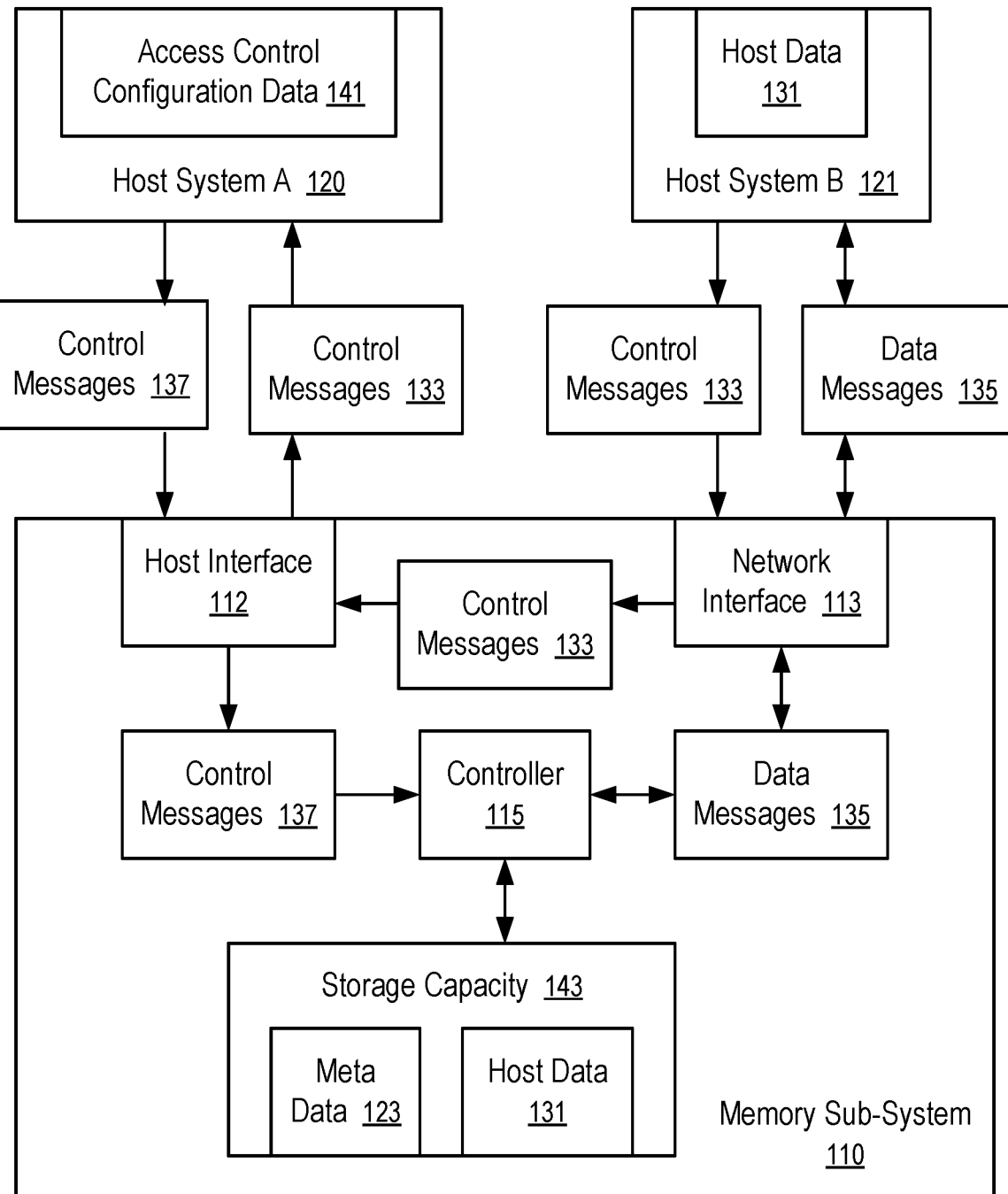
FIG. 2 shows different paths for processing control messages and data messages in a memory sub-system according to one embodiment.

FIG. 2 shows different paths for processing control messages and data messages in a memory sub-system according to one embodiment.

For example, the processing paths of FIG. 2 can be implemented using a memory sub-system 110 of FIG. 1 and/or the computing system 100 of FIG. 1.

In FIG. 2, a remote host system 121 is connected (e.g., over a computer network 114 as in FIG. 1) to the network interface 113 of the memory sub-system 110. The remote host system 121 can store host data 131 into the storage capacity 143 of the memory sub-system 110, and retrieve the host data 131 back from the memory sub-system 110, using a storage protocol, such as internet small computer systems interface (iSCSI), fibre channel (FC), fibre channel over ethernet (FCoE), network file system (NFS), and server message block (SMB), or another protocol.

Using the storage protocol, the remote host system 121 can send control messages 133 to the memory sub-system 110 to manage and/or administrate the storage capacity. For example, the host system can sign into the memory sub-system to start a session and/or a read/write operation. The control message 133 can include a command to generate a namespace in the storage capacity 143, to create, delete, open, or close a file in the namespace, to set security attributes (e.g., which files are readable and/or writable by which users), etc.

The control messages 133 received via the network interface 113 are forwarded to the host interface 112 connected to the local host system 120 for processing. Processed control messages 137 are provided to the controller 115 of the memory sub-system 110. Execution of commands/requests in the processed control messages 137 can generate meta data 123 that controls the data storage operations of the memory sub-system 110.

Some of the control messages 133 can be used to generate access control configuration data 141, such as identifications of user accounts, access privileges, user credentials, etc.

Optionally, the local host system 120 connected to the memory sub-system 110 can provide a user interface. An administrator can use the user interface to generate control messages 137 to perform administrative and/or management operations, such as creating accounts, record or change access credentials, generate namespaces, etc. At least a portion of the access control configuration data 141 can be generated via the user interface.

The access control configuration data 141 can be stored in part in the memory sub-system 110, or in another storage device connected to the local host system 120.

Subsequently, when the remote host system 121 sends a control message 133 for authentication or access, the local host system 120 can receive the control message 133 and use the access control configuration data 141 to determine whether to permit the access. If the request is permitted, the local host system 120 can send a control message 137 to the controller 115 of the memory sub-system to set up access. For example, in response to the control message 137, the controller 115 can set up a channel to the storage capacity. For example, the channel can include one or more queues in the local memory 119 for the read/write operations permitted by the control message 137. In some implementations, the channel can further include a portion of the meta data 123 generated to facilitate the read/write operations (e.g., for address translation).

To write host data 131 into the memory sub-system 110, the remote host system 121 can transmit a data message 135 containing a write command and data to be stored. In response to the data message 135, the controller 115 can write the received data into the storage capacity using the channel set up for the operation of the remote host system 121. Thus, the data message 135 is not routed to the local host system 120. Bypassing the local host system 120 in routing the data message 135 prevents the local host system 120 from accessing the host data 131 in the data message 135. Thus, the security for the host data 131 is improved.

To access the host data 131 stored in the memory sub-system 110, the remote host system 121 can send a data message 135 containing a read command. In response to the read command in the data message 135, the controller 115 can use the channel set up for the operation of the remote host system 121 to retrieve the host data 131 and generate a response in the form of a data message 135. The data message 135 is transmitted back to the remote host system 121 using the network interface 113 without going through the host interface 112. Thus, the local host system 120 does not have access to the host data 131 retrieved from the storage capacity 143, which also improves security for the host data 131.

Thus, by separating control messages 133 for routing into the local host system 120, only a very tiny portion of messages communicated between the remote host system 121 and the network interface 113 is routed through the local host system 120. Thus, the requirements on processing power and communication bandwidth on the local host system 120 are drastically reduced, while allowing the local host system 120 to exercise control over security, administrative, and management operations of the memory sub-system 110. The reduction makes it easy to scale up the storage capacity controlled by the local host system 120. For example, multiple memory sub-systems (e.g., 110) can be connected over a computer bus or a peripheral bus 125 to the local host system 120, while the memory sub-systems (e.g., 110) are separately connected to one or more computer networks (e.g., 114) via their respective network interfaces (e.g., 113).

In some implementations, the network interface 113 includes a logic circuit, a controller, and/or a processor configured to recover, identify, determine, or generate the control messages 133 and the data messages 135 from data packets received from a computer network 114.

In some other implementations, the processing power of the controller 115 is used to convert network packets received in the network interface 113 into the control messages 133 and the data messages 135. The controller 115 can include a processor configured with instructions to generate the control messages 137 and the data messages 135.

Figure 3:
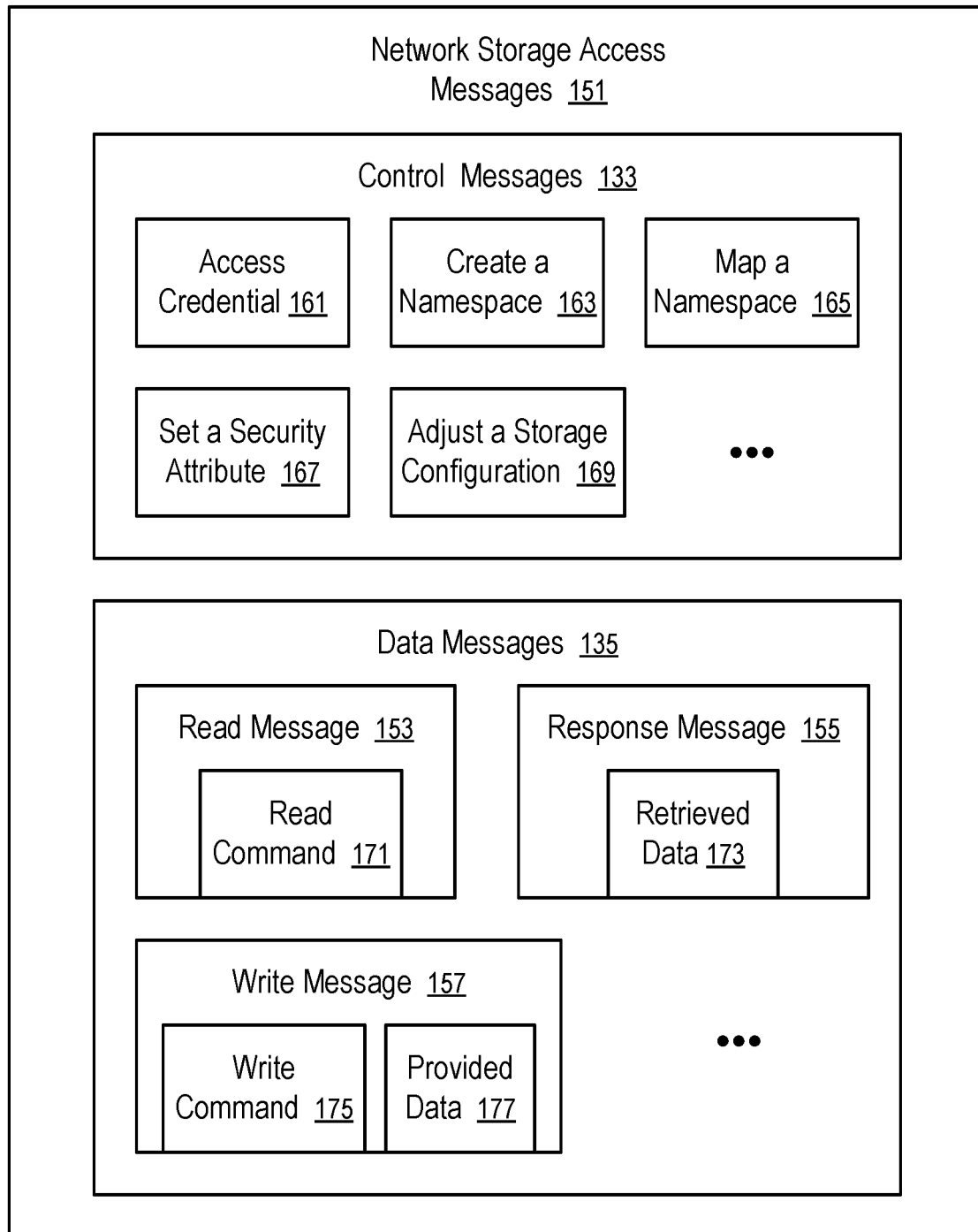
FIG. 3 shows a configuration of control messages and data messages for processing in a memory sub-system according to one embodiment.

FIG. 3 shows a configuration of control messages and data messages for processing in a memory sub-system according to one embodiment.

For example, the separation of control messages 133 and data messages 135 for routing in different processing paths in FIG. 2 can be implemented according to the configuration of FIG. 3.

Network storage access messages 151 communicated between a remote host system 121 and the network interface 113 of a memory sub-system 110 can be partitioned into control messages 133 and data messages 135 as illustrated in FIG. 3.

The control messages 133 can include a message containing access credential 161 to start a session or an operation.

The control messages 133 can include a message containing a command to create a namespace 163 in the storage capacity 143.

The control messages 133 can include a message containing a command to map a namespace 165 in the storage capacity 143.

The control messages 133 can include a message containing a command to set a security attribute 167 in the storage capacity 143 (e.g., a read permission for a user, a write permission for a user).

The control messages 133 can include a message containing a command to adjust a storage configuration 169 (e.g., move a file).

The control messages 133 can include other commands that can change meta data 123 in the memory sub-system 110 to control and organize host data 131. However, the control messages 133 do not include host data 131 to be written into the memory sub-system 110 and/or host data 131 being read from the memory sub-system 110.

The data messages 135 can include a read message 153 having a read command 171 (and an address of data to be read), a response message 155 having data 173 retrieved from the storage capacity 143, a write message 157 having a write command 175 and provided data 177 to be written into the storage capacity 143, a message having a trim or deallocation command, etc.

The control messages 133 are routed through the host interface 112 of the memory sub-system 110, but the data messages 135 are not routed through the host interface 112 of the memory sub-system 110. In some implementations, network storage access messages 151 received for the network interface 113 in one storage protocol is converted to control messages 133 and data messages 135 in another protocol for a local storage device (e.g., a solid-state drive, a memory device 130).

In one aspect, a method is provided to process network messages to access storage of a memory sub-system according to one embodiment.

For example, the method can be performed by a storage manager configured in a memory sub-system 110 and/or a local host system 120 of FIG. 1 to have different processing paths illustrated in FIG. 2 using a configuration of FIG. 3. For example, a storage manager in the memory sub-system 110 can be implemented to perform operations discussed in connection with the memory sub-system 110; and the storage manager can be implemented via a logic circuit and/or a processing device 117 of the memory sub-system controller 115, and/or instructions programmed to be executed by the processing device 117. For example, a storage manager in the local host system 120 can be implemented to perform operations discussed in connection with the local host system 120; and the storage manager can be implemented via a logic circuit and/or a processing device 118 of the host system 120, and/or instructions programmed to be executed by the processing device 118.

In the method, a network interface 113 of a memory sub-system 110 receives, over a computer network 114, packets from a remote host system 121.

For example, the memory sub-system 110 can have a storage device, such as a memory device 130, a solid-state drive having one or more memory devices 130, . . . , 140 to provide a storage capacity 143 accessible to the remote host system 121 over a computer network 114. The memory sub-system 110 can have a host interface 112 operable on a peripheral bus 125 connected to a local host system 120 to process a portion of network storage access messages 151 generated from the packets. The memory sub-system 110 can have a storage manager (e.g., implemented via a controller 115 coupled to the host interface 112, the network interface 113, and the solid-state drive).

In the method, the memory sub-system 110 determines (e.g., using a storage manager), from the packets, first control messages 133 and first data messages 135 that include first host data 131 provided by the remote host system 121.

For example, the remote host system 121 can access the storage functions of the memory sub-system 110 using a storage protocol, such as internet small computer systems interface, fibre channel, fibre channel over ethernet, network file system, or server message block, or another protocol. The first control messages 133 and first data messages 135 can be determined from the messages transmitted by the remote host system 121 using the storage protocol. In some implementations, the first control messages 133 and first data messages 135 are recovered from the packets received at the network interface 113. In some implementations, the messages transmitted from the remote host system 121 are translated to a protocol for accessing the solid-state drive.

In the method, the memory sub-system 110 sends (e.g., using the storage manager), through a host interface 112 of the memory sub-system 110, the first control messages 133 to a local host system 120.

For example, the host interface 112 can be configured according to a computer peripheral bus 125 according to serial advanced technology attachment, peripheral component interconnect express, universal serial bus, fibre channel, serial attached small computer system interface, double data rate, small computer system interface, open NAND flash interface, low power double data rate, non-volatile memory express, or compute express link, or another computer bus technique.

In the method, the local host system 120 processes (e.g., via a storage manager), the first control messages 133 to generate second control messages 137.

In the method, the memory sub-system 110 receives (e.g., via its storage manager), via the host interface 112 from the local host system 120, the second control messages 137 responsive to the first control messages 133.

In the method, the memory sub-system 110 processes (e.g., via its storage manager), the second control messages 137 and the first data messages 135, without sending the first data message 135 and/or the first host data 131 to the local host system 120, to write the first host data 131 into a memory device 130 of the memory sub-system 110.

For example, the first data messages 135 can include a write command 175; and the first host data 131 (e.g., provided data 177) can be written into a memory device (e.g., 130) of the memory sub-system according to the write command without the write command 175 and/or its data 177 going through the host interface 112.

For example, the first data message 135 can include a read command 171. In response, the memory sub-system 110 can read second host data (e.g., data 173) from the solid-state drive and/or a memory device (e.g., 130) according to the read command 171 specified in the first data messages 135. The memory sub-system 110 generates second data messages (e.g., response message 155) containing the second host data (e.g., data 173). The memory sub-system 110 transmits, via the network interface 113, the second data messages (e.g., response message 155) to the remote host system 121 without the second host data (e.g., retrieved data 173) and/or the second data messages (e.g., response message 155) going through the host interface 112.

For example, the memory sub-system 110 can be configured to process the second control messages 137 to generate meta data 123 according to which the first host data 131 is written into the solid-state drive (e.g., the memory device 130) and the second host data (e.g., data 173) is retrieved from the solid-state drive (e.g., the memory device 130).

For example, the first control messages include a command (e.g., create a namespace 163, map a namespace 165) to create, map, or delete a namespace; and the meta data 123 is associated with the namespace.

For example, the memory sub-system 110 can be configured to process the second control messages 137 to set up a channel to write the first host data 131 or read the second host data (e.g., data 173).

For example, the memory sub-system 110 can have random-access memory (e.g., memory 119); and the channel can include one or more queues configured, according to the second control messages, for writing data into, and/or retrieving data from, the solid-state drive.

For example, the channel can be configured with data used by the controller 115 of the memory sub-system 110 to perform address translation to write the first host data 131 into the solid-state drive.

For example, the first control messages 133 include a credential 161 to access a storage capacity 143 of the solid-state drive. The local host system 120 can validate the credential 161 based on access control configuration data 141.

For example, the first control messages 133 include a command to set a security attribute 167, and/or a command to adjust a storage configuration 169 in the solid-state drive.

The local host system 120 is configured to process the first control message 133 to exercise security control and perform administrative operations.

In at least some embodiments, the local host system 120 is configured to process a selected subset of messages received in the network interface 113 of the memory sub-system 110. The subset to be selected for processing can be specified by the local host system 120. The memory sub-system 110 can select the subset according to the selection criteria specified by the local host system 120 and provide the selected subset to the local host system 120 without providing the remaining messages to the local host system 120.

For example, the network interface 113 of the memory sub-system 110 can include, or be connected to, an internal processor (e.g., controller 115 and/or processing device 117). The internal processor is configured to convert data packets received in the network interface 113 into messages. The internal processor is further configured to convert response messages 155 into data packets for transmission by the network interface 113 to a remote host system 121.

The messages received from the remote host system 121 can be classified into categories or types. FIG. 3 illustrates a configuration of classifying messages into control messages 133 and data messages 135. Alternatively, the messages 151 can be classified as one group of messages for processing by the local host system 120, and another group of messages for processing by the memory sub-system 110 without being communicated to the local host system 120.

A configuration file can be written by the local host system 120 into the memory sub-system 110 to indicate the criteria for selecting messages for the local host system 120.

For example, the configuration file can specify that messages containing read commands 171 and write commands 175 are in a group of messages for processing by the memory sub-system 110 itself and other messages are selected for processing by the local host system 120.

For example, the configuration file can be stored into the memory sub-system 110 to request the memory sub-system 110 to forward messages related to access control to the local host system 120 for processing.

For example, a configuration file can be stored into the memory sub-system 110 to request the memory sub-system 110 to forward data messages of reading or writing data in a particular namespace for processing by the local host system 120.

In general, the selection of messages for processing by the local host system 120 can use various message attributes and/or parameters in constructing selection criteria. For example, the selection criteria can be formulated based on command type, command category, storage destination, data source, data size, user account, access type, time and date, etc. Thus, the selection of messages for processing by the local host system is not necessarily limited by a predetermined classification (e.g., control messages 133 for processing by the local host system and data messages 135 for processing by the memory sub-system 110 itself).

The internal processor of the memory sub-system 110 can be implemented as a controller 115 and/or a processing device 117 configured via instructions and/or logic circuits. The internal processor identifies and separates messages 151 received from a computer network 114 according to the configuration file. The internal processor identifies a subset of the messages 151 according to the configuration file and transmitted the subset to the local host system 120. The local host system 120 can process the messages in the subset and transmit responses to the memory sub-system 110 for further processing. The internal processor identifies and processes the remaining messages within the memory sub-system 110 without transmitting them to the local host system 120.

For example, the memory sub-system 110 can include a random-access memory and a local storage device, such as a solid-state drive, a hard drive, etc. The internal processor can buffer the messages, selected for processing by the local host system 120, in the random-access memory for retrieval by the local host system 120. Other messages can be transmitted from the internal processor to the local storage device without being buffered in the random-access memory and/or without being transmitted to the local host system 120.

Optionally, the local host system 120 can also use the configuration file to specify the criteria for selecting a portion of the response messages 155 for processing by the local host system 120. For example, the internal processor selects a portion of the response messages 155 according to the configuration file and buffer the selected response messages 155 in the random-access memory for retrieval by the local host system 120. After the processing of the selected response messages 155, the local host system 120 can provide messages to the memory sub-system 110 for transmission by the network interface 113. The remaining response messages 155 can be selected according to the configuration file and transmitted by the memory sub-system 110 without going through the local host system 120.

The local host system 120 can process the selected messages to apply security measures, control access, transform data, perform dynamic administrative operations, etc.

The memory sub-system 110 can be configured as a storage product without options for hardware reconfiguration, modification, and/or customization. The storage product is manufactured as a computer storage component usable through designed connections to an external processor and to the network interface.

For example, the storage product can be configured with a bus connector, a network port, and the memory sub-system 110. The memory sub-system 110 is inaccessible without going through the bus connector and the network port. The bus connector is connected to the controller 115 of the memory sub-system 110; and the network port is connected to the network interface 113.

The storage product can be configured in the form of an expansion card having the bus connector insertable into an expansion slot on a mother board for a connection to a computer bus 125 and thus the local host system 120. Alternatively, the bus connector can be a port; and a computer cable adapted for the computer bus 125 can be inserted into the port for connecting to the local host system 120.

Optionally, the storage product can be configured to have a form factor similar to a hard drive, a solid-state drive, an external drive, a network drive, etc. The storage product has a casing or housing that encloses its components and protects them from tampering.

After the network port of the storage product is connected to a computer network 114 and the bus connector to a computer bus 125, the internal processor of the storage product can block network storage services until the local host system 120 specifies the configuration file. Subsequently, the network interface 113 of the storage product can communicate with one or more remote host systems (e.g., 121) to provide network storage services. Messages received from the remote host systems are separated on different processing paths according to the configuration file. A subset of the messages is provided to the local host system 120 for processing using a storage application and/or an operating system. By processing the subset of the messages, the local host system 120 can control and/or administer the activities within the storage product, extend the functionality of the storage product, and customize the services offered by the storage product without a need to modify the hardware of the storage product and/or the firmware of the storage product. The remaining messages, not selected for processing by the local host system 120, are processed by the memory sub-system 110 itself.

In some implementations, the configuration file can include identifications of messages to be blocked, or discarded. When the network interface 113 receives a message classified for blocking, the internal processor can delete or discard the message without further processing the message by itself or forwarding it to the local host system 120. For example, the storage product can be shipped with a default configuration file that blocks all of the messages 155 to disable network storage services. A local host system 120 can change the configuration file to enable and/or customize network storage services.

A portion of the memory sub-system 110 can be configured as a local storage device. Messages not selected for processing by the local host system 120 can be forwarded to the local storage device for processing. The local storage device can have local memory 119 to buffer received commands, schedule commands for execution, and perform other storage operations, such as address translation, wear leveling, garbage collection, error detection and correction, In some implementations, when connected to the storage product, the local host system 120 functions as a central processing unit of the storage product. Optionally, the storage product can be configured to be inoperable standalone without the external central processing unit.

Optionally, the local host system 120 can be configured with a user interface to receive inputs from an administrator to configure the configuration file for selecting messages. The user interface can be further used to receive inputs to specify access control configuration data 141, and/or to receive request to perform administrative operations, such as creating a namespace, creating a user account, assigning user access rights, etc. In response to the inputs received in the user interface, the local host system 120 can generate control messages 137 for execution by the memory sub-system 110 in the storage product.

The storage product can be configured with sufficient resources to perform predefined operations, such as network operations and storage operations, without assistance from the external processor. For example, when allowed, operations requested via the data messages 135 received in the network interface 113 can be performed by the storage product without assistance from an external processor (e.g., processing device 128 of the local host system 120) connected to the storage product. For example, the storage product itself has sufficient resources to convert between network packets and network storage access messages 151, perform operations to store or retrieve data, and perform other storage operations, such as address translation, wear leveling, garbage collection, error detection and correction, etc.

The external processor can execute instructions programmed to perform access control, administer network storage services, manage storage configuration, data processing, and/or other operations. Commands for administrative operations can be received in a local user interface without going through a network interface (e.g., 113). Alternatively, or in combination, a remote host system (e.g., 121) can send commands to the network interface (e.g., 113) to request the administrative operations. Thus, the external processor can exercise control over data manipulation operations within the storage product.

The storage product can be designed to optimize performance and cost based on the communication bandwidth of the network interface 113. The network communication bandwidth substantially defines the workloads of the components with the storage product. Thus, the storage product can be manufactured and provided as a computer component usable as a storage building block. A storage system can be built using one or more such storage products connected to a same external processor. The storage capacity of the storage system can be easily scaled up by using more storage products connected to the storage system with their network interfaces being separately connected to one or more computer networks. Since the workload of the external processor is light in typical applications, the processing power and communication bandwidth of the external processor are not likely to be a bottleneck in practical applications.

In contrast, a conventional network attached storage device does not have an interface for an external processor. Such a conventional storage device is entirely responsible for the processing of the messages and data received at its network interface. Access control and security are implemented via its firmware. Maintaining security of such firmware can be a challenge. There is no mechanism in a conventional network attached storage device to apply control and administration operations without requesting through the network interface of the storage device.

When a storage product has an interface for an external processor, control and administrative operations can be performed via the external processor without going through the network interface of the storage product for improved security. Instead of relying solely upon the firmware of the storage product to handle security and administrative operations through the network interface, a storage system implemented using the storage product can use software running the external processor of the storage product to apply security control and perform administrative operations. Further, security measures can be implemented in both the firmware of the storage product and the software running in the external processor; and such an arrangement can improve security by increasing the difficulties for gaining unauthorized access.

Further, the storage product can be configured to bypass the external processor in processing the data messages 135 that contains host data 131 (e.g., as in FIG. 2). Thus, the host data 131 is protected against security breaches in the local host system 120. Since the external processor does not have access to the host data 131, unauthorized access to the host data 131 cannot be made via the external processor.

When the storage product (e.g., memory sub-system 110) is connected to an external processor via the host interface 112 of the storage product to form a computing device, the external processor can function as a central processing unit of the computing device. However, the storage product can be configured to provide limited access to the central processing unit.

For example, the central processing unit can be provided with access to control messages 133 specifically identified by the network interface 113 for processing to generate control messages 137 for execution in a storage device within the storage product. However, the central processing unit can be prevented from accessing the network interface 113 directly. For example, the central processing unit can be prevented from using the network interface 113 to transmit messages and/or receive messages other than processing the control messages 133 identified by the network interface 113. Thus, the difficulty for unauthorized access to hack, through the network interface, the system running in the central processing unit is increased; and the risk of the system running in the central processing unit being hacked via a computer network 114 and/or the Internet is eliminated, minimized, or reduced.

Similarly, the controller 115 can limit the access of the external processor to the storage capacity 143. The central processing unit can send control messages 137 without obtaining responses. Responses to read commands are routed to the network interface directly without going through the central processing unit. Further, the storage product can be configured to filter the control messages 137 from the external processor to remove commands other than the commands for security and administration.

For example, after booting up the system running in the central processing unit, the controller 115 can reject or drop messages of the same type as the data messages 135 when the messages are from the central processing unit. Thus, the central processing unit can be prevented from reading the host data 131, and/or writing over or erasing the host data 131.

In some implementations, the storage functions, access control, and administrative operations of the storage product are managed by an external processor connected to the host interface 112 without involving the network interface 113. An administrator can dynamically monitor the activities, update and/or enhance the software executed in the external processor.

For example, a storage application running in the external processor can be programmed to provide a user interface. An authorized administrator can use the user interface to specify access control configuration data 141, such as who has access to what content, which portion of storage capacity (e.g., namespace), what set of resources and capabilities gets exposed, etc. The access commands received at the network interface 113 (e.g., in control messages 133) can be checked against the access control configuration data 141 and/or mapped to appropriate locations in the storage capacity 143. The external processor can set up mapping for access commands/requests received at the network interface 113 (e.g., for read or write operations) from locations as identified by the remote host system 121 into corresponding commands in accessing appropriate locations in the storage capacity 143.

For example, the operation system and/or the storage application running in the external processor can be configured to be only on the control path for security and administration but not on the data path. The data to be written into or retrieved from the storage capacity 143 does not go through the host interface 112 to the external processor. Instead, the computing resources built in the storage product are used to process the data being stored or retrieved. Thus, the communication bandwidth to the external processor, and the computational workload applied to the external processor are small, relative to the data flow into or output from the storage product. As a result, the external processor can be used to control multiple storage data processing units in scaling up the capability in handling large data flows.

Figure 4:
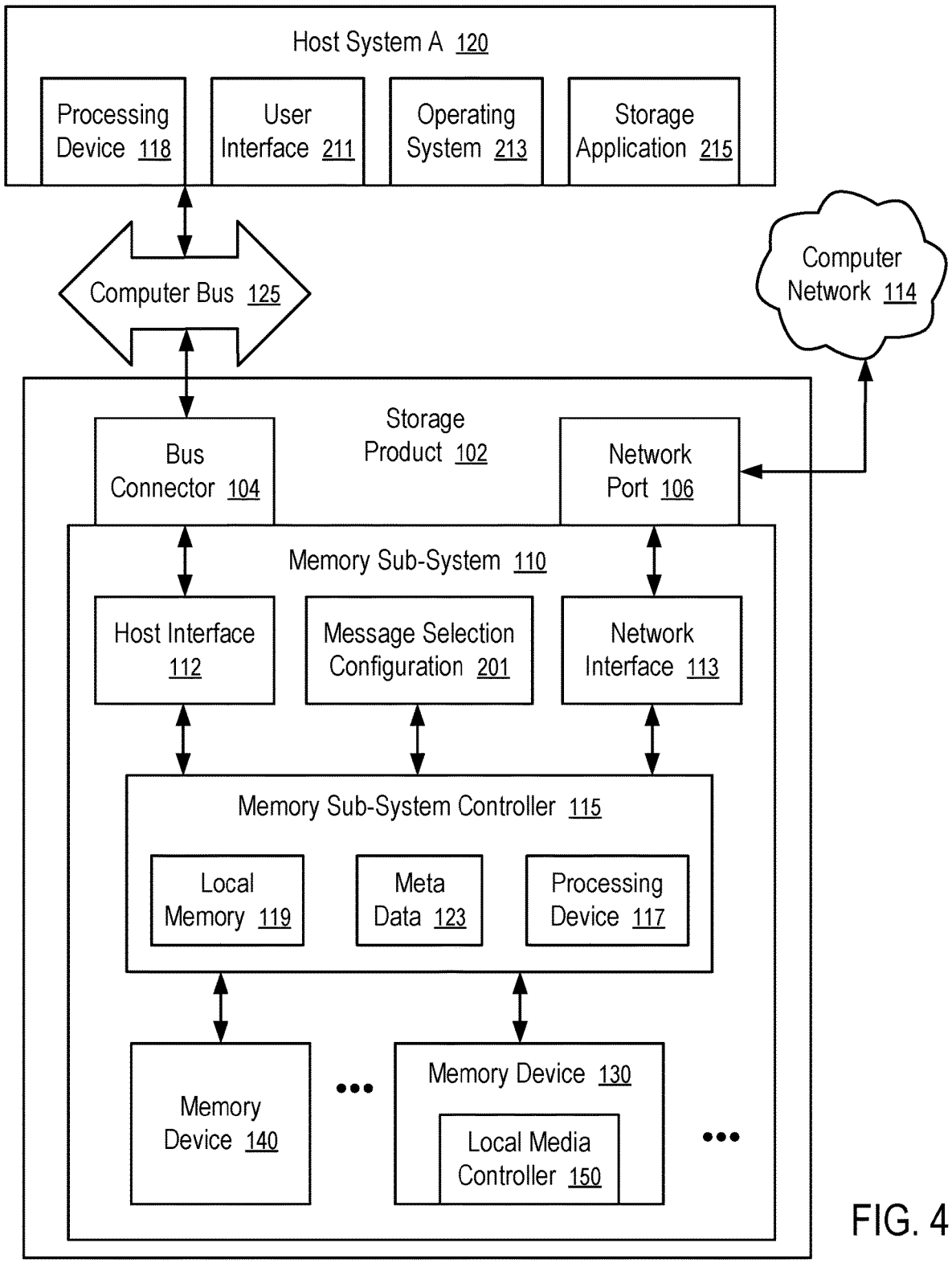
FIG. 4 shows a network-ready storage product configured to have an external processor selectively processing messages for the storage product according to one embodiment.

FIG. 4 shows a network-ready storage product 102 configured to have an external processor selectively processing messages for the storage product according to one embodiment.

For example, the network-ready storage product 102 can be implemented using a memory sub-system 110 of FIG. 1 and/or FIG. 2 configured to have different processing paths for control messages 133 and data messages 135.

In FIG. 4, the storage product 102 includes a memory sub-system 110 (e.g., as in FIG. 1), a bus connector 104 and a network port 106.

The memory sub-system 110 has a message selection configuration 201 that can be specified by an external processor (e.g., local host system 120, processing device 118). The message selection configuration 201 identifies the selection criteria of messages to be processed by the external processor, and the selection criteria of messages to be processed by the memory sub-system 110 itself. Optionally, the message selection configuration 201 can further include the selection criteria of messages to be blocked, discarded, or ignored.

The message selection configuration 201 can be stored in a memory or a register file of the memory sub-system 110 to control how the memory sub-system 110 dispatches different messages on different processing paths. Optionally, the local host system 120 can dynamically adjust the configuration file for the selection of messages for processing on different paths.

For example, to configure messages on different processing paths according to the configuration of FIG. 3, the message selection configuration 201 can be configured to identify the messages 161 to 169 as control messages 133 for processing by the local host system 120. Further, the message selection configuration 201 can be configured to read messages 153, response messages 155, write messages 157, etc., as data messages 135 for processing by the data storage product 102 itself without being forwarded to the local host system 120.

For example, the message selection configuration 201 can specify the types of messages to be processed by the storage product 102 itself and requests the remaining messages to be forwarded to the local host system 120 for processing.

For example, the message selection configuration 201 can be configured to specify the types of messages to be processed by the local host system 120 and request the storage product 102 to process the remaining messages without forwarding the messages to the local host system 120.

For example, the message selection configuration 201 can be configured to specify certain types of messages to be processed by the storage product 102 itself, specify certain types of messages to be transmitted to the local host system 120 for processing, and request the storage product 102 to block, discard, or ignore remaining messages.

The classifications of messages, or selection criteria, can be based on types of messages, commands specified in the messages, parameters specified for the commands, such as address, user account, access type, etc.

The controller 115 of the memory sub-system 110 can be configured to determine the routing destinations of messages 151 based on the message selection configuration 201.

The storage product 102 can be manufactured without a central processing unit for general-purpose processing. The processing logic and computing resources in the storage product are designed according to core storage operations for network storage services. Customization of the services can be implemented via the use of a message selection configuration 201 to select messages for processing by the local host system 120 external to the storage product 102.

The storage product 102 can be shipped from a manufacturer as a standalone computer component for production or assembling of network storage devices, servers, computers, etc.

A network cable can be inserted into the network port 106 of the storage product 102 for a network connection between a remote host system 121 and the network interface 113 of the storage product 102. In some implementations, the network interface 113 includes a wireless transceiver for a wireless computer network (e.g., a wireless local area network or WiFi network); and the network port 106 includes a connector for an antenna for the transceiver.

The bus connector 104 of the storage product 102 can be connected a computer bus 125. When the storage product 102 is connected via the computer bus 125 to a local host system 120, the combination of the local host system 120 and the storage product 102 can be a computing device configured to provide network storage services, such as the services of a typical network attached storage device.

The storage product 102 can be manufactured to include an optional casing or housing that encloses the memory sub-system 110, in a way similar to a solid-state drive, a hard disk drive, an external drive, a network drive, etc. (e.g., as in FIG. 11). In some implementations, the storage product 102 is configured on a printed circuit board (PCB); and a portion of the printed circuit board (PCB) is configured as the bus connector 104 insertable into an expansion slot (e.g., a PCIe slot on a mother board) (e.g., as in FIG. 12). Alternatively, the bus connector 104 can be configured as a port such that a computer cable (e.g., according to PCIe, USB) can be inserted for a connection to the computer bus 125.

The bus connector 104 and the network port 106 provide access to the logic circuits within the storage product 102.

In some implementations, power to operate the memory sub-system 110 is provided via the bus connector 104 or the network port 106. In other implementations, the storage product 102 has a separate power connector to receive power for the operations of the memory sub-system 110.

The storage product 102 offers no other interfaces for accessing its components, and/or for modifying and/or augmenting the hardware of the storage product 102. Thus, the usage of the storage product 102 in constructing the hardware of computing devices, servers, network storage devices, etc. can be greatly simplified.

In addition to being connected to the bus connector 104 and the local host system 120, the computer bus 125 can be further connected to peripheral devices, such as a monitor, a keyboard, a mouse, a speaker, a printer, a storage device storing access control configuration data 141 and/or instructions of an operating system 213 and/or a storage application 215 to be executed in the central processing device, etc.

Some of the peripheral devices can be used to implement a user interface 211 to receive commands to manage the storage capacity 143 of the memory sub-system 110 (e.g., storage quota, storage partition) and/or to manage access control configuration data 141 (e.g., user accounts, access rights, credential).

For example, the user interface 211 can be used to generate the content of the message selection configuration 201; and the storage application 215 and/or the operating system 213 can be used to write the message selection configuration 201 into a predetermined location within the memory sub-system 110 to control its operations in dispatching messages 151 onto different paths. Alternatively, or in combination, the message selection configuration 201 can be stored into the memory sub-system 110 by an authorized user of a remote host system 121 over the network interface 113.

In some implementation, the access control configuration data 141 are generated and/or configured via the user interface for the network storage services of the storage product 102. Such an arrangement removes the need to configure, adjust, and/or administer the access control configuration data 141 through the network interface 113 over a computer network 114. Thus, the security of the access control configuration data 141 can be improved. To further improve security, the message selection configuration 201 can be configured to reject, block, ignore or discard a portion of the control messages 133 that are received from the computer network 114 and configured to set up or change access control configuration data 141.

Similarly, administrative operations can be performed via the user interface to relieve remote host systems (e.g., 121) from being programmed to perform such operations via a network connection.

Optionally, when a portion of control and/or administrative requests is implemented to receive via the bus connector 104, messages received in the network port 106 for such operations can be selected for blocking, rejecting, discarding, etc.

The storage capability controlled by the local host system 120 can be expanded by connecting, to the computer bus 125, one or more other storage products similar to the storage product 102.

In some implementations, the local host system 120 can send, through the computer bus 125, commands to control the operations of at least some of the components configured within the storage product 102. For example, the local host system 120 can send commands to start or stop the operation of the network interface 113, manage the network attributes/configuration of the network interface 113, etc. For example, the local host system 120 can send commands to the memory sub-system controller 115 to start or stop its operations. For example, the local host system 120 can send commands to write data into the local memory 119 and read data from the local memory 119.

Figure 11:
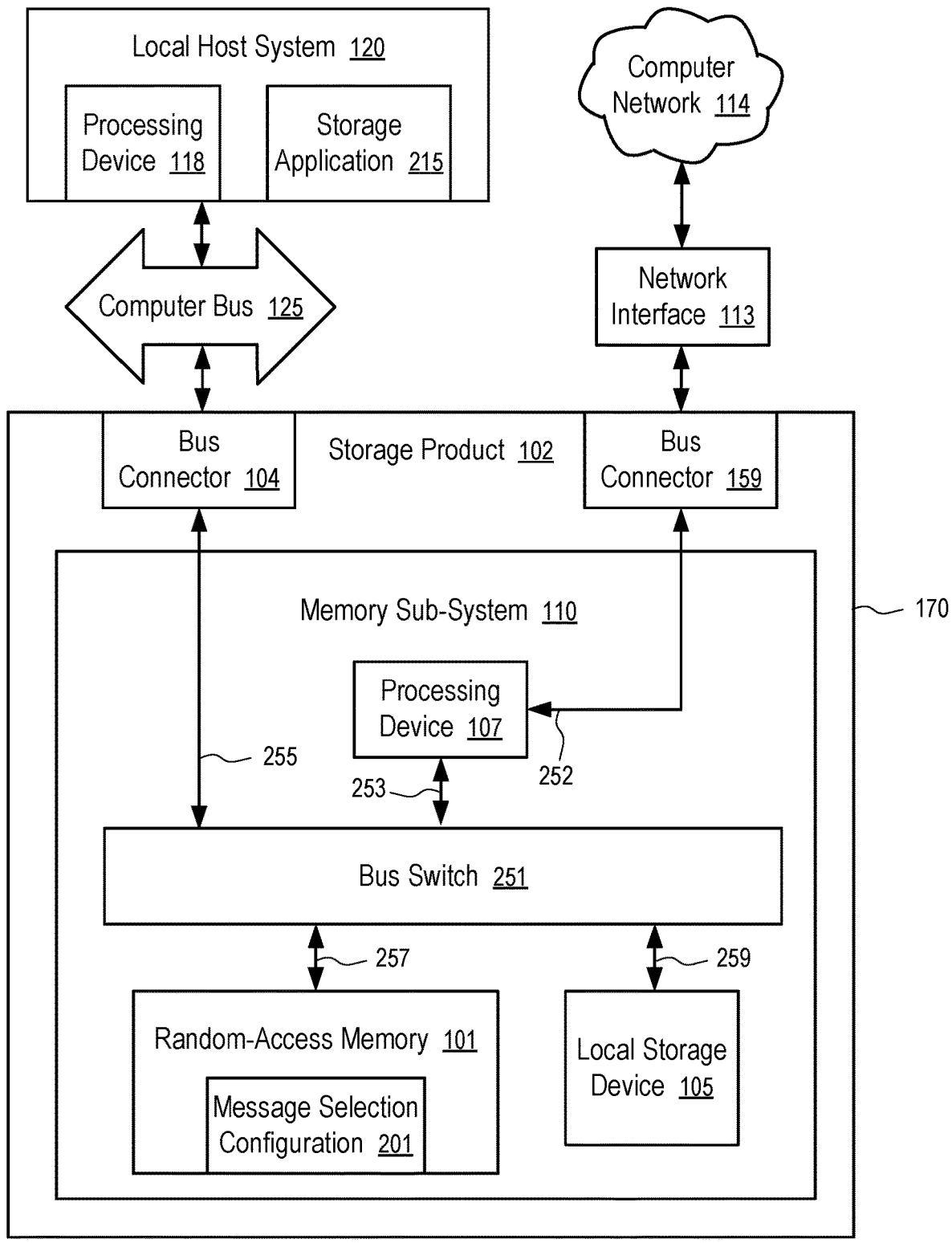
FIG. 11 shows a storage product having a storage device, a bus connector to an external processor, and a bus connector to an external network interface according to one embodiment.
Figure 12:
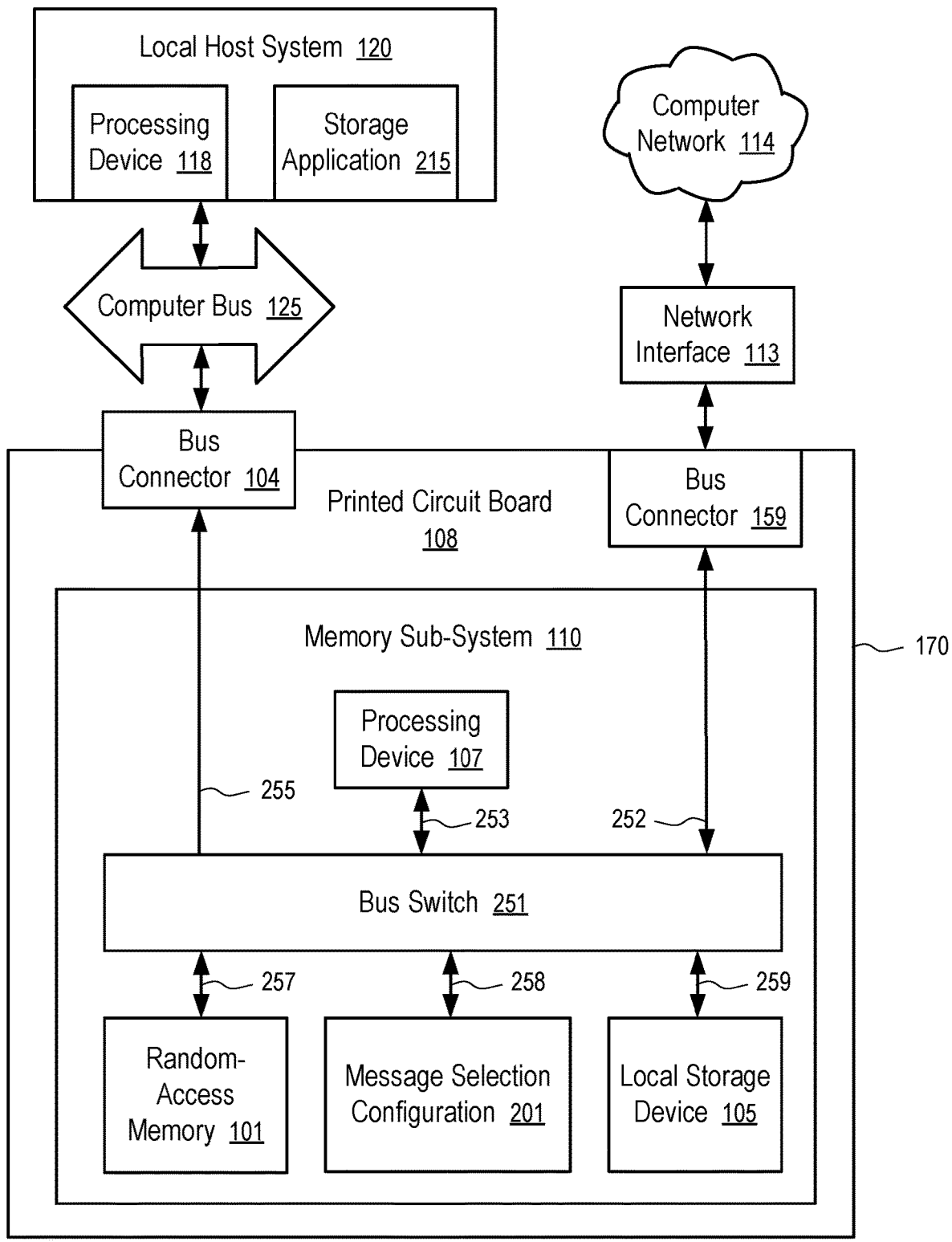
FIG. 12 shows a storage product configured on a printed circuit board according to one embodiment.

In some implementations, at least a portion of the controller 115 and the memory devices 130, . . . , 140 are configured as one or more local storage devices (e.g., solid-state drives) as in FIG. 11 and FIG. 12; and the local host system 120 can send to the storage device commands for storage operations, such as create or delete namespaces, read data at specified addresses, write data at specified addresses, erase data at specified addresses, etc.

Optionally, the local host system 120 has limited access to the components in the memory sub-system 110. For example, the access can be limited to the receiving of the messages 133 identified by the network interface 113 according to the message selection configuration 201 for processing by an external processor of the storage product 102 and sending the control messages 137 responsive to the selected messages 133 or responsive to user inputs specified in the user interface provided via the instructions executed in the local host system 120.

Figure 5:
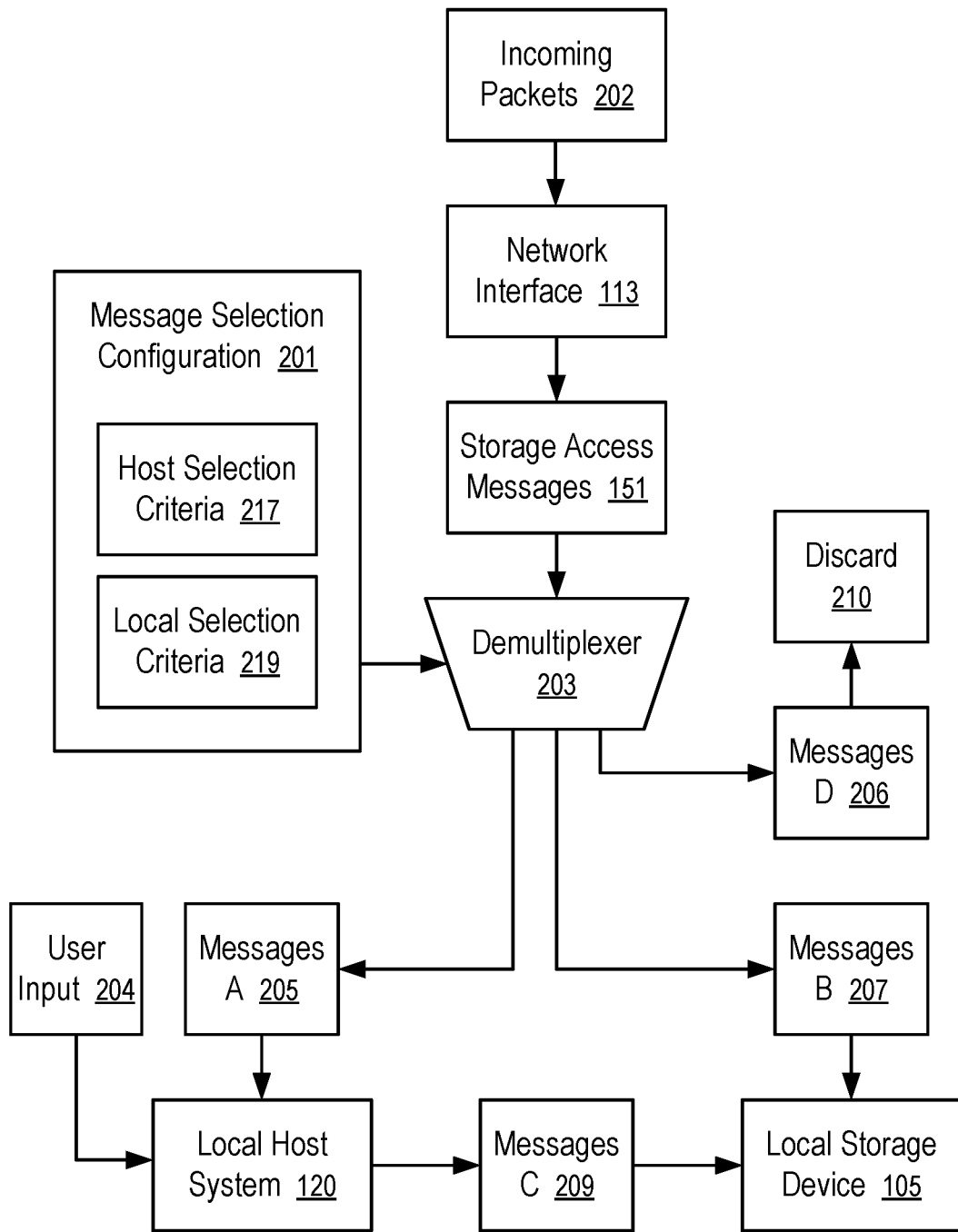
FIG. 5 illustrates a technique to configure a storage product to route messages for processing on different paths according to one embodiment.

FIG. 5 illustrates a technique to configure a storage product to route messages for processing on different paths according to one embodiment.

For example, the messages received in the network interface 113 of the memory sub-system 110 in FIG. 1, FIG. 2, and/or FIG. 4 can be separated for processing by a local host system and a storage device respectively.

In FIG. 5, incoming packets 202 received in the network interface 113 are used to construct storage access messages 151. The messages 151 can have different types, attributes, and/or parameters. The messages 151 can include messages 205, 207, and 206. A demultiplexer 203 is controlled by a message selection configuration 201 to separate the messages 205, 207, and 206 for different processing paths.

The message selection configuration 201 can specify host selection criteria 217 and local selection criteria 219 to select messages for the local host system 120 and for a local storage device 105 respectively.

A message 205 that satisfies the host selection criteria 217 is dispatched by the demultiplexer 203 to the local host system 120. In response to the message 205, the local host system 120 can generate one or more messages 209 for further processing by the local storage device 105. Such a message 205 is not provided to the local storage device 105 without going through the local host system 120.

For example, a storage application 215 running in the local host system 120 can be configured to process the input messages 205 and generate the output messages 209 for the local storage device 105.

A message 207 that satisfies the local selection criteria 219 is dispatched by the demultiplexer 203 to the local storage device 105 without going through the local host system 120.

A message 206 does not satisfy the host selection criteria 217 and does not satisfy the local selection criteria 219. The multiplexer 203 selects and discard 210 such a message 206.

In some implementations, the local host system 120 can also receive user inputs 204 from a user interface 211 to generate output messages 209 for the local storage device 105.

Figure 8:
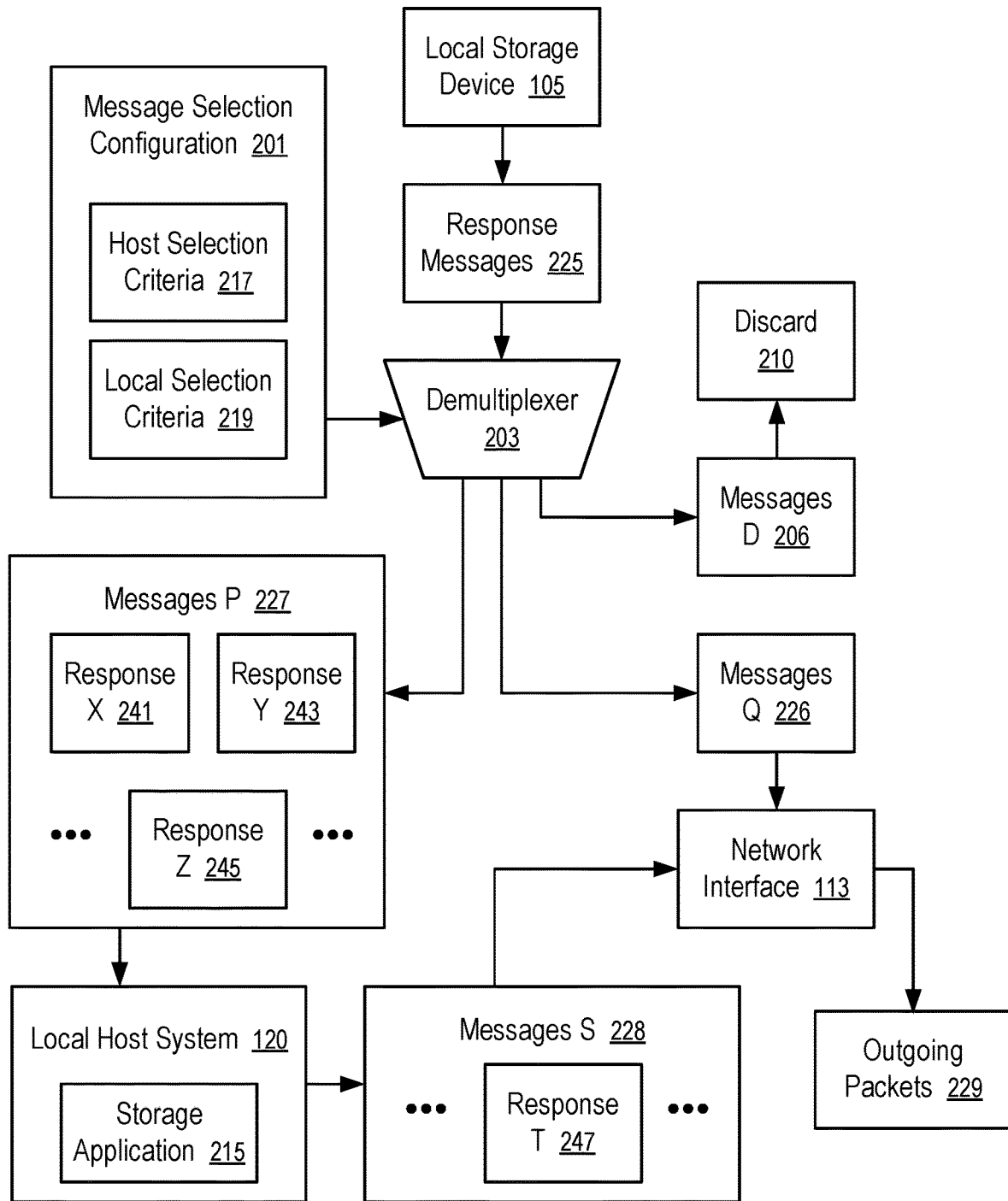
FIG. 8 shows a storage application programmed to generate responses for transmission by a storage product according to one embodiment.

FIG. 5 illustrates the selection of messages 151 coming from the network interface 113 for processing by the local host system 120 or the local storage device 105. Similarly, a portion of the responsive messages 155 generated by the local storage device 105 can also be optionally identified in the message selection configuration 201 for processing by the local host system 120. The local host system 120 processes the selected receive messages 155 to generate resulting messages and provides the resulting message to the storage product 102 for transmission via the network interface 113, as illustrated in FIG. 8.

In at least some embodiments, the network storage services provided via the storage product 102 are implemented and defined at least in part by the software running in the local host system 120 external to the storage product 102.

For example, the storage application 215 running in the local host system 120 can be programmed to generate new control messages 137 based on control messages 133 received in the network interface 113 of the storage product 102. The functionality of the storage product 102, from the point of view of the remote host system 121, can be changed and/or implemented via the programming of the storage application 215.

For example, the remote host system 121 can send a message 133 that is not executable in the storage product 102. When the message 133 corresponds to a function not predefined/designed for the storage product 102, the storage product 102 can generate messages 137 to implement the function. The message 133 can be selected according to the message selection configuration 201 for processing by the local host system 120. The storage application 215 running on the local host system 120 can be programmed to process the message 133 to implement such a function that is not native to the storage product 102. For example, the storage application 215 can be programmed to dynamically change or remap a control message 133 received in the network interface 113 into a combination of messages 137 that are executable, natively supported in the storage product 102. Receiving and executing the combination of messages 137 in the storage product 102 implement the function corresponding to the message 133. Thus, the functionality of the network storage services provided via the storage product 102 can be defined at least in part by data and/or logic external to the storage product 102.

As an example, the storage application 215 can be configured to generate control messages 137 to store multiple copies of data for a dataset to improve reliability of the dataset. The dataset can be selected via time, an account, a user, a namespace, an application, and/or other data selection criteria. The replication can be dynamically turned on or off, or performed for a dynamically selected dataset without the need to update the firmware and/or hardware of the storage product 102.

For example, the storage application 215 can be configured to provide a centralized user interface to receive commands to perform administrative operations, configure and/or customize the functions offered via the storage product 102, etc.

Figure 6:
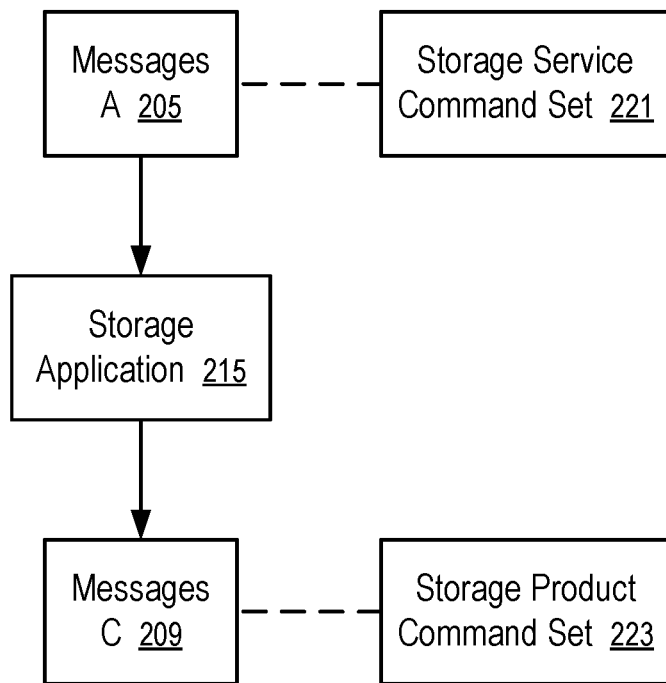
FIG. 6 shows a storage application mapping messages received from a computer network into messages to be executed in a storage product to implement network storage services according to one embodiment.

FIG. 6 shows a storage application mapping messages received from a computer network into messages to be executed in a storage product to implement network storage services according to one embodiment.

For example, the storage application 215 of FIG. 6 can be implemented in a local host system 120 connected to a storage product 102 having a memory sub-system 110 according to FIG. 1, FIG. 2, and/or FIG. 4.

In FIG. 6, a memory sub-system 110 and/or a storage product 102 containing the memory sub-system 110 can be designed to support a storage product command set 223. Commands or requests according to the storage product command set 223 can be processed within the memory sub-system 110 without assistance from outside of the memory sub-system 110.

The storage application 215 can be programmed to support storage service command set 221, which can optionally contain at least a portion the storage product command set 223. At least a portion of the storage service command set 221 can be outside of the storage product command set 223.

A message 205 forwarded from the memory sub-system 110 for processing by the local host system 120 can be processed by the storage application 215. In addition to determine whether the operation identified by the message 205 is permitted in view of access control configuration data 141, the storage application 215 can determine an implementation of the operation using the storage product command set 223.

For example, when a command or request in the message 205 is supported in the storage product command set 223, the storage application 215 can simply forward the received message 205 as the message 209 transmitted to the memory sub-system 110 for processing, after a determination that the command or request is permitted according to the access control configuration data 141.

In some implementations, the storage application 215 can alter one or more parameters provided in the message 205 to generate the output message 209 for the memory sub-system 110 to process.

When a command or request in the message 205 is not in the storage product command set 223, the storage application 215 can be programmed to map the received message 205 to one or more output messages 209 that are in the storage product command set 223 to implement the function requested by the message 205. Thus, at least some of the network storage services offered to the remote host system 121 can be defined and implemented by the storage application 215.

In some instances, a command or request in the incoming messages 205 can be in the storage product command set 223 but selected for add-on services and/or features. In response to such an incoming message 205, the storage application 215 can generate addition messages 209 to implement the add-on services and/or features, in addition to forwarding the incoming message 205 to the storage product 102.

Figure 7:
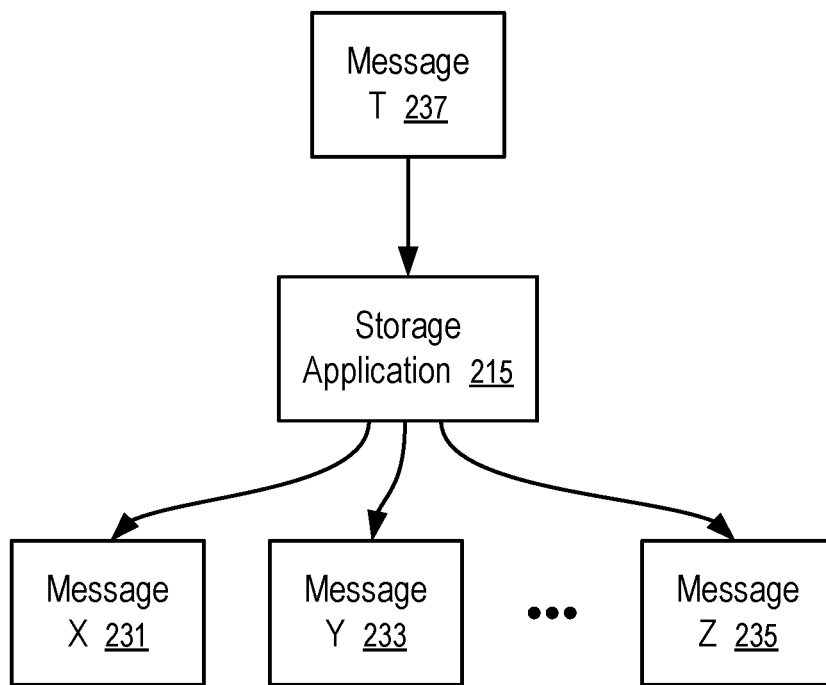
FIG. 7 illustrates a storage application programmed to implement a message using multiple messages to a storage product according to one embodiment.

In some implementations, the storage application 215 can program a set or sequence of messages to implement the function requested by an incoming message, as illustrated in FIG. 7.

FIG. 7 illustrates a storage application programmed to implement a message using multiple messages to a storage product according to one embodiment.

For example, one of the messages 205 received in the storage application 215 in FIG. 6 can be processed in a way illustrated in FIG. 7.

In FIG. 7, a message 237 received in the storage application 215 can be one of the control messages 133 (or messages 205) selected for processing by the local host system 120 according to the message selection configuration 201 of FIG. 4 and/or FIG. 5. The storage product 102 is incapable of processing the received message 237 to implement its associated function without assistance from outside of the storage product 102.

To implement the function associated with the received message 237, the storage application 215 can generate a set, or a sequence, of messages 231, 233, . . . , 235. For example, the messages 231, 233, . . . , 235 can be a portion of the control messages 137 (or messages 209) provided by the local host system 120 to the memory sub-system 110 and/or the local storage device 105 to implement the request identified by the received message 237.

The commands or requests in the messages 231, 233, ..., 235 are configured in the storage product command set 223. Thus, the storage product 102, the memory sub-system 110, and/or the local storage device 105 can process the messages 231, 233, ..., 235 without further assistance from outside of the storage product 102.

The messages 231, 233, ..., 235 are configured to use the resources and/or functions of the storage product 102 to implement the request of the incoming message 237. For example, the messages 231, 233, ..., 235 can use one or more command in the storage product command set 223 to retrieve a relevant portion of the meta data 123 stored in the storage product 102, process the retrieved data, and write data into the storage product to record results, to configure the storage product 102 in processing subsequent read/write requests, etc. Thus, the storage application 215 can control how data is processed for storage and retrieval in implementing new services not native to the storage product 102.

The message selection configuration 201 can be configured to select response messages 155 generated by the local storage device 105 and request the storage product 102 to provide the selected messages to the local host system 120 for processing. For example, the responses to the messages 231, 233, ..., 235 can be selected for processing by the storage application 215 to generate a response to the incoming message 237 according to a storage service command set 221, as in FIG. 8.

FIG. 8 shows a storage application programmed to generate responses for transmission by a storage product according to one embodiment.

For example, the storage application 215 in FIG. 8 can be used to process the responses to the messages 231, 233, ..., 235 generated in FIG. 7 to implement an incoming message 237 selected in a way illustrated in FIG. 5.

In FIG. 8, a local storage device 105 in a storage product 102 is configured to process messages 209 received from a local host system 120 and messages 207 that bypasses the local host system 120. After executes the commands and/or requests in the messages 207 and 209, the local storage device 105 can generate response messages 225.

A demultiplexer 203 in the storage product 102 can separate the response messages 225 based on the host selection criteria 217 and the local selection criteria 219 specified in the message selection configuration 201.

For example, messages 227 can be selected according to the host selection criteria 217 for a processing path that involves the local host system 120. The storage application 215 in the local host system 120 can provide response messages 228 for transmission by a network interface 113 of the storage product 102.

For example, messages 226 can be selected according to the local selection criteria 219 for bypassing the local host system 120.

The network interface 113 generates outgoing packets 229 for transmitting messages 226 and 228 into a computer network 114.

Other messages 206 not selected via the host selection criteria and not selected via the local selection criteria 219 can be discarded 210.

For example, in response to the messages 231, 233, ..., 235 received to implement the incoming message 237 in FIG. 7, the local storage device 105 can generate responses 241, 243, ..., 245 respectively. The storage application 215 can combine the responses 241, 243, ..., 245 to generate a response 247 for the incoming messages 237.

In some implementations, a copy of data relevant to the operations and services of the storage product 102 is stored in the storage product 102. Thus, another local host system 120 having the storage application 215 can be dynamically connected to the storage product 102 to replace a local host system 120 currently connected to the storage product 102 in processing messages selected according to the message selection configuration 201. Alternatively, another memory sub-system connected to the computer bus 125 can be used to store the data.

In at least some embodiments, the storage product 102 is configured with a bus switch to route messages on different processing paths.

For example, the bus switch can be a PCIe bus switch connecting components of the storage product 102, such as the network interface 113, the local storage device 105, the bus connector 104, the controller 115, etc.

For example, after the network interface 113 uses its processing power to convert the incoming packets 202 received from a computer network 114 into storage access messages 151, the network interface 113 can use the bus switch to send the messages 205 selected according to the host selection criteria 217 to the local host system 120 (e.g., using a peer to peer protocol). Thus, the local storage device 105 does not have access to the messages 205 selected for processing by the local host system 120.

Similarly, the network interface 113 can identify the messages 207 for processing by the local storage device 105 according to the local selection criteria 219 and use the bus switch to send the messages 207 directly to the local storage device 105 (e.g., using a peer to peer protocol). Thus, the local host system 120 does not have access to the messages 205 selected for processing by the local storage device 105.

After the local host system 120 generates the messages 209 for processing by the local storage device 105, the local host system 120 can use the bus switch to send its generated messages 209 to the local storage device 105 directly (e.g., using a peer to peer protocol). Thus, the network interface 113 does not have access to the messages 209 generated by the local host system 120.

After the local storage device 105 generates response messages 225, the local storage device 105 can use the bus switch to send to the local host system 120 the response messages 227, responsive to the messages 209 received from the local host system 120. After the local host system 120 generates response messages 228 for the messages 205 received from the network interface 113, the local host system 120 can use the bus switch to send the response messages 228, responsive to the messages 205 processed by the local host system 120, to the network interface 113 for transmission.

Similarly, the local storage device 105 can use the bus switch to send, to the network interface 113, the response messages 226, generated in response to the message 207 received directly from the network interface 113.

In some implementations, the messages 205 to the local host system 120 and the messages 209 from the local host system 120 can be buffered in a random-access memory of the storage product 102. The local host system 120 can use the bus switch to access the random-access memory; and a processing device of the storage product 102 can use the bus switch to access the random-access memory to buffer the messages 205 into the random-access memory for processing by the local host system 120 and to retrieve the messages 209 generated by the local host system 120 for dispatching to the local storage device 105.

Figure 9:
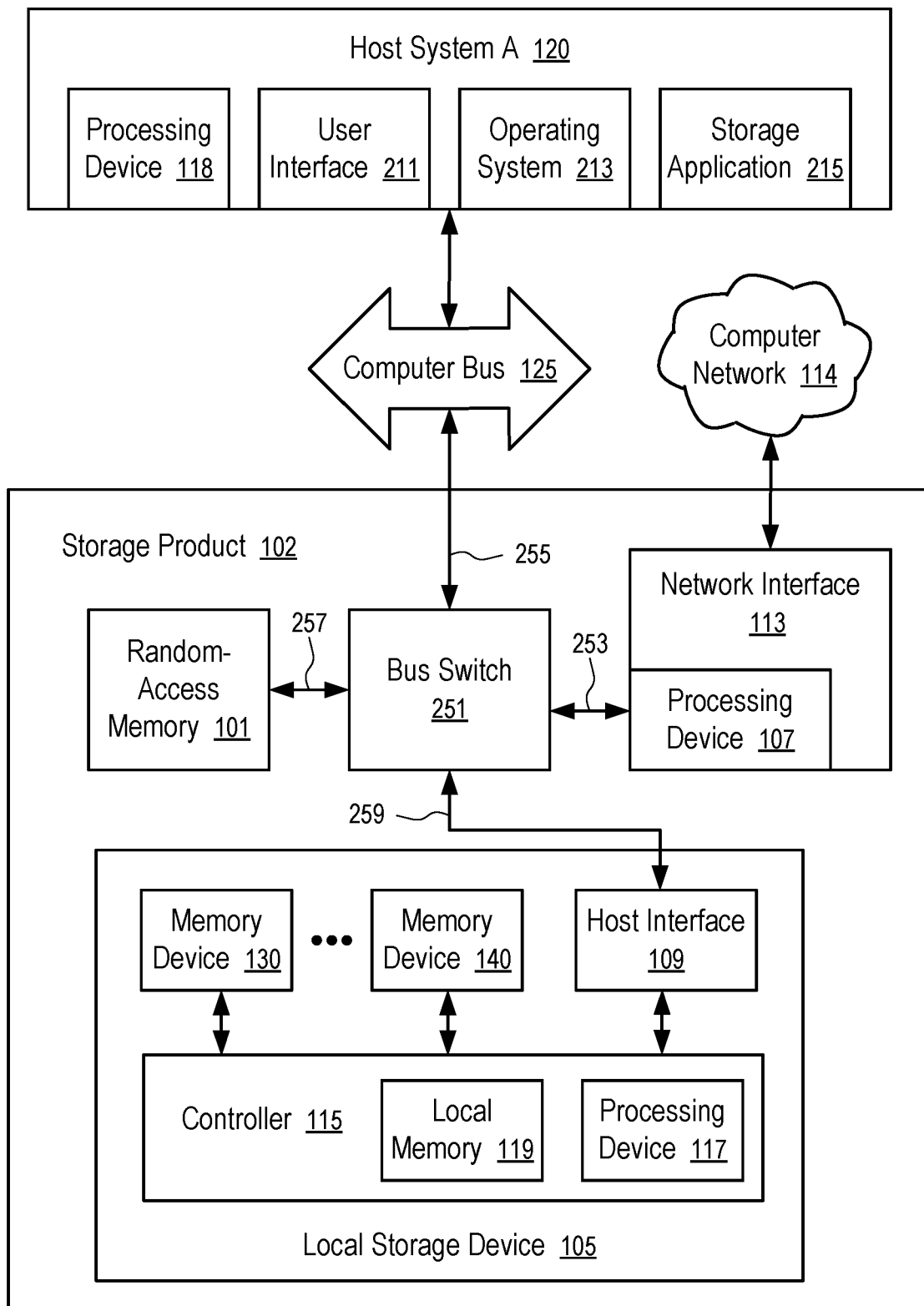
FIG. 9 shows a storage product configured with a bus switch to route messages for internal and external processing according to one embodiment.

FIG. 9 shows a storage product 102 configured with a bus switch to route messages for internal and external processing according to one embodiment.

For example, the storage product 102 of FIG. 4 can be implemented in a way as in FIG. 9.

In FIG. 9, the storage product 102 has a bus switch 251. At least some components of the storage product 102 have connections (e.g., 253, 257, 259) to the bus switch 251. Further, the bus switch 251 has a connection 255 to an external computer bus 125 connected to a local host system 120.

In FIG. 9, the storage product 102 has a random-access memory 101, a local storage device 105, and a network interface 113. The network interface 113 includes a processing device 107 configured to convert incoming packets 202 to storage access messages 151, and to convert response messages 247 and 226 to outgoing packets 229.

The bus switch 251 can connect any two of the connections 253, 255, 257, 259 and disconnection other connections from them to provide a communication channel between the two connections.

For example, the bus switch 251 can join the connections 255 and 257 to provide a communication channel in the form of a functioning computer bus between the local host system 120 and the random-access memory 101. The connections 253 and 259 and thus the processing device 107 and the local storage device 105 are disconnected from the functioning computer bus to prevent interfering with communications between the local host system 120 and the random-access memory 101.

The local host system 120 can be in control of the communication over the communication channel to the random-access memory 101; and the communications over the channel can be according to the protocol of the computer bus 125. For example, the local host system 120 can retrieve messages 205 buffered into the random-access memory 101 by the processing device 107 for processing, buffer its generated messages 209 for processing in the local storage device 105, and/or buffer response messages 228 into the random-access memory 101 for transmission via the network interface 113.

For example, the bus switch 251 can join the connections 253 and 259 to provide a communication channel in the form of a functioning computer bus between the processing device 107 and the local storage device 105. The connections 255 and 257 and thus the local host system 120 and the random-access memory 101 are disconnected from the functioning computer bus to prevent interfering with communications between the processing device 107 and the local storage device 105.

The processing device 107 can be in control of the communication over the communication channel to the local storage device 105; and the communications over the channel can be according to the protocol of the computer bus 125. For example, the processing device 107 can send the messages 207 selected according to the local selection criteria 219 to the local storage device 105 without buffering the messages 207 into the random-access memory 101; and the processing device 107 can retrieve the response messages 226 selected according to the local selection criteria 219 from the local storage device 105.

For example, the local storage device 105 has a local memory 119; and the processing device 107 can buffer the messages 207 into the local memory 119 for processing by the local storage device 105 and retrieve the response messages 226 buffered in the local memory 119 by the local storage device 105.

For example, the bus switch 251 can join the connections 253 and 257 to provide a communication channel in the form of a functioning computer bus between the processing device 107 and the random-access memory 101. The connections 255 and 259 and thus the local host system 120 and the local storage device 105 are disconnected from the functioning computer bus to prevent interfering with communications between the processing device 107 and the random-access memory 101.

The processing device 107 can be in control of the communication over the communication channel to the random-access memory 101; and the communications over the channel can be according to the protocol of the computer bus 125. For example, the processing device 107 can buffer messages 205 selected according to the host selection criteria 217 into the random-access memory 101 for retrieval by the local host system 120, and retrieve from the random-access memory 101 the response messages 228 generated by the local host system 120.

In some implementations, the processing device 107 can further retrieve, from the random-access memory 101, the messages 209 generated by the local host system 120 and buffer the retrieved messages 209 into the local memory 119 in the local storage device 105 for processing.

For example, the bus switch 251 can join the connections 257 and 259 to provide a communication channel in the form of a functioning computer bus between the local storage device 105 and the random-access memory 101. The connections 253 and 255 and thus the local host system 120 and the processing device 107 are disconnected from the functioning computer bus to prevent interfering with communications between the local storage device 105 and the random-access memory 101.

The local storage device 105 can be in control of the communication over the communication channel to the random-access memory 101; and the communications over the channel can be according to the protocol of the computer bus 125. For example, the local storage device 105 can retrieve the messages 209 generated and buffered by the local host system 120 in the random-access memory 101, and buffer response messages 227 responsive to messages 209 from the local host system 120 into the random-access memory 101 for retrieval by the local host system 120.

Alternatively, the processing device 107 can retrieve the messages 209 generated and buffered by the local host system 120 in the random-access memory 101 and buffer the retrieved messages 209 into the local memory 119 of the local storage device 105 for processing.

Similarly, instead of the local storage device 105 buffering the response messages 227 into the random-access memory 101 for processing by the local host system 120, the processing device 107 can retrieve the response messages 225 from the local memory 119 of the local storage device 105, select the response messages 227 according to the host selection criteria 217, and buffer the selected response messages 227 into the random-access memory 101 for retrieval by the local host system 120.

In some implementations, the bus switch 251 can join the connections 255 and 259 to provide a communication channel in the form of a functioning computer bus between the local host system 120 and the local storage device 105. The connections 253 and 257 and thus the random-access memory 101 and the processing device 107 are disconnected from the functioning computer bus to prevent interfering with communications between the local storage device 105 and the local host system 120.

The local host system 120 can be in control of the communication over the communication channel to the local storage device 105; and the communications over the channel can be according to the protocol of the computer bus 125.

For example, instead of communicating the messages 209 generated by the local host system 120 via the random-access memory 101, the local host system 120 can buffer the generated message 209 directly into the local memory 119 of the local storage device 105 for processing. Bypassing the random-access memory 101 for communications of messages 209 generated by the local host system 120 to the local storage device 105 can reduce the size requirement for the random-access memory 101 and/or improve performance.

For example, instead of communicating the response messages 227 generated by the local storage device 105 via the random-access memory 101, the local host system 120 can directly retrieve the response messages 227 from the local memory 119 of the local storage device 105 for processing.

Optionally, the local host system 120 can have a random-access memory 101 accessible via the computer bus 125. Thus, the communications to and/or from the storage application 215 can be via the random-access memory of the local host system 120; and the random-access memory 101 can be configured in the network interface 113 to remove the connection 257.

In one example, the network interface 113 is connected to the bus switch 251 via the processing device 107. In some implementations, the network interface 113 and the processing device 107 have separate connections 253 to the bus switch 251; and the bus switch 251 can connect the separate connections 253 to provide a communication channel in the form of a functioning computer bus between the processing device 107 and the network interface 113. Through the communication channel, the processing device 107 can receive the incoming packets 202 from the network interface 113; and the network interface 113 can receive the outgoing packets 229 for transmission into the computer network 114.

Communications over the computer bus 125 and/or the interconnect 103 can be implemented according to serial advanced technology attachment (SATA), peripheral component interconnect express (PCIe), universal serial bus (USB), fibre channel (FC), serial attached SCSI (SAS), double data rate (DDR), small computer system interface (SCSI), open NAND flash interface, low power double data rate (LPDDR), non-volatile memory (NVM) express (NVMe), compute express link (CXL), or another technique.

The random-access memory 101 can be implemented using dynamic random-access memory (DRAM), synchronous dynamic random-access memory (SDRAM), static random-access memory (SRAM), three-dimensional cross-point ("3D cross-point") memory, etc.

The storage device 105 can have a host interface 109 configured to communicate on a bus (e.g., provided by the bus switch 251 between the connections 253 and 259) to receive commands and send responses.

For example, the bus switch 251 can be adapted to connect computer buses of a same type as the computer bus 125 on which the local host system 120 is connected. Alternatively, a host interface 112 of the storage product 102 can be used to bridge the computer bus 125 and the bus switch 251.

The storage device 105 can have a controller 115 having a local memory 119 and a processing device 117, similar to the memory sub-system controller 115 in FIG. 1. The controller 115 can buffer, in the local memory 119, commands and data received via the host interface 109. The processing device 117 can be configured via instructions and/or logic circuits to execute write commands to store data into the memory devices 130, . . . , 140, to execute read commands to retrieve host data 131, etc. In some implementations, the host interface 109 of the local storage device 105 uses a same communications protocol as the host interface 112 of the storage product 102 and/or the bus switch 251.

In some implementations, the bus switch 251 can provide multiple communication channels simultaneously for different pairs of connections.

For example, while the connection 253 to the processing device 107 and the connection 257 to random-access memory 101 are connected by the bus switch 251 for the processing device 107 to access the random-access memory 101, the connection 255 to the local host system 120 and the connection the connection 259 to the local storage device 105 can be connected by the bus switch 251 at the same time for the local host system 120 to access the local storage device 105.

For example, while the connection 255 to the local host system 120 and the connection 257 to the random-access memory 101 are connected by the bus switch 251 to allow the local host system 120 to access the random-access memory 101, the connection 253 to the processing device 107 and the connection 259 to the local storage device 105 can be connected by the bus switch 251 for the processing device 107 to access the local storage device 105 at the same time.

For example, while the bus switch 251 connects the connections 253 to provide a communication channel between the network interface 113 and the processing device 107, the bus switch 251 can connect two of the connections 255, 257 and 259 to provide a communication channel between the local host system 120 and the random-access memory 101, or between the random-access memory 101 and the local storage device 105, or between the local host system 120 and the local storage device 105.

In at least some embodiments, a storage product 102 is configured with a bus interface for control by an external processor (e.g., local host system 120) and another bus interface for operating an external network interface to provide network storage services. For example, both of the bus interfaces can be PCIe interfaces; and the storage product 102 can be configured with a PCIe bus switch to connect the bus interfaces to other components within the storage product 102, such as a random-access memory 101, a processing device 107, a local storage device 105, etc.

For example, the storage product 102 can be configured with two connections to external computer buses. One of the connections can be connected to a computer bus 125 that is also connected to a local host system 120. The other connection can be connected to an external network interface that is further connected to a computer network 114. Thus, the storage product 102 does not have to be manufactured and/or shipped with a network interface 113; and different types of network interfaces 113 can be used with the storage product 102. Since the storage product 102 is configured to control the operations of the external network interface, the local host system 120 can be separate from the external network interface. Thus, the data flows through the network interface through to the local host system 120 can be reduced in a way similar to the use of an internal network interface 113 as in FIG. 1, FIG. 2, FIG. 4, and/or FIG. 9.

For example, one PCIe interface of the storage product 102 can be configured to receive the incoming packets 202 or storage access messages 151 from an external network interface. The processing device 107 in the storage product 102 can be configured to generate the storage access messages 151 from the incoming packets 202 or receive the storage access messages 151 from the external network interface. The processing device 107 can identify messages 205 (e.g., control messages 133) according to a predetermined selection criteria, or the host selection criteria 217 specified in the message selection configuration 201. The processing device 107 can provide the messages 205 to an external processor (e.g., local host system 120) connected to the other PCIe interface of the storage product 102. The external processor can generate messages 209 (e.g., in response to the messages 205 and/or user inputs received in the user interface 211) to apply controls in view of access control configuration data 141. The storage product 102 can obtain the messages 209 via the PCIe interface to the external processor.

In some implementations, the processing device 107 can function as a host operating the external network interface connected to one of the PCIe interfaces of the storage product 102. In other implementations, the external network interface can be configured as a host connected to the storage product 102 and send the incoming packets 202 or the storage access messages 151 to the storage product 102. For example, the external network interface can buffer the incoming packets 202 or the storage access messages 151 into the random-access memory 101 for processing by the processing device 107.

Thus, instead of relying upon an internal network interface to communicate on a computer network 114 to provide network storage services and/or to receive administrative inputs, a user interface 211 in the local host system 120 can be used to receive the administrative inputs; and an external network interface can be used to communicate on the computer network 114.

Optionally, an additional network interface controlled by the external processor (e.g., local host system 120) can be used to communicate at least in part on the computer network 114 to facilitate the network storage services. However, relying upon the use of the local host system 120 to communicate over the computer network 114 can create a bottleneck in scaling up the storage capacity controlled by the local host system 120.

Figure 10:
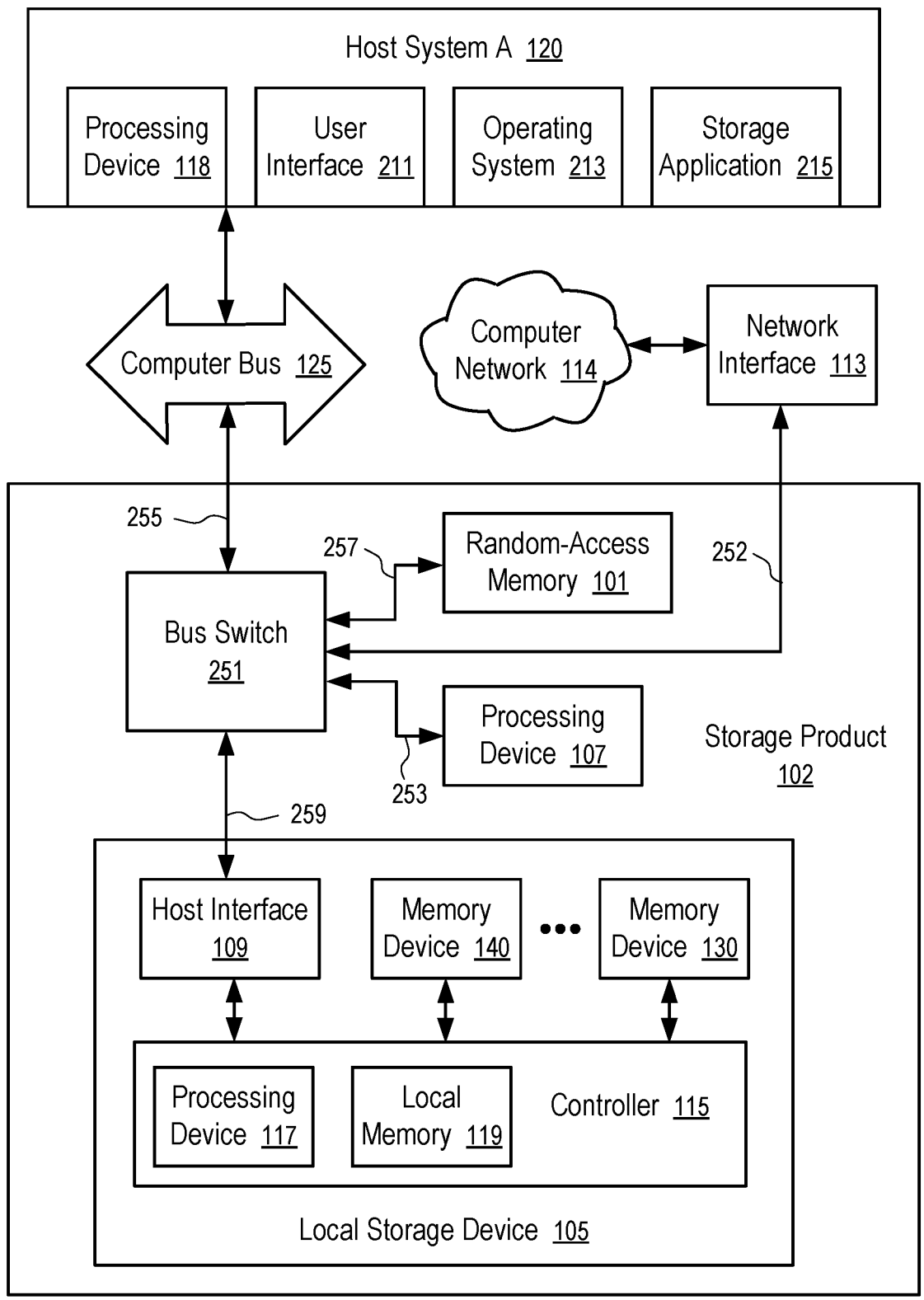
FIG. 10. shows a storage product configured to use an external network interface to provide network storage services according to one embodiment.

FIG. 10. shows a storage product configured to use an external network interface to provide network storage services according to one embodiment.

For example, the storage product 102 of FIG. 9 can be modified to use an external network interface 113 as in FIG. 10. Thus, it is not necessary to configure an internal network interface 113 in the storage product 102 as in FIG. 9.

The storage product 102 of FIG. 10 does not offer an internal network interface 113. Instead, the storage product 102 provides a connection 252 that can be used to connect an external network interface 113 to the bus switch 251.

For example, the storage product 102 can be connected to a wired network interface 113 having a wired transceiver for a wired connection to the computer network 114, or a wireless network interface 113 having a wireless transceiver for a wireless connection to the computer network 114.

For example, the storage product 102 can be connected to a network interface 113 of a first type (e.g., Ethernet) for a connection of a first type to a computer network 114, or a network interface 113 of a second type (e.g., fibre channel) for a connection of a second type to a computer network 114.

Thus, the capability of the storage product 102 of FIG. 10 to use different types of network interfaces can increase the interoperability of the storage product 102 as a pre-manufactured computer component in various applications and/or computer systems.

In some implementations, when an external network interface 113 is connected to the bus switch 251 via the connection 252, the external network interface 113 can be configured as a host system of the storage product 102.

For example, the external network interface 113 can be provided with access to the random-access memory 101 (or a portion of it) to buffer the incoming packets 202 received by the external network interface 113 from the computer network 114. The processing device 107 can be configured to retrieve the incoming packets 202 from the random-access memory 101 to generate the storage access messages 151.

Alternatively, the external network interface 113 has computing resources to convert the incoming packets 202 into the storage access messages 151. Thus, the external network interfaces 113 can buffer the storage access messages 151 into the random-access memory 101 for distribution by the processing device 107.

The processing device 107 of FIG. 10 can be configured to distribute the storage access messages 151 in a way similar to the processing device 107 of FIG. 9.

The local host system 120 and the storage product 102 can be configured to generate response messages 226 and 228 in a way similar the way described in connection with FIG. 9.

When the storage product 102 has the response messages 226 and 228, the storage product 102 can buffer the response messages 226 and 228 in the random-access memory 101 for transmission by the external network interface 113 as a host system. Alternatively, the processing device 107 converts the response messages 226 and 228 into outgoing packets 229 and buffers the outgoing packets 229 into the random-access memory 101 for transmission by the external network interface 113.

In some implementations, when an external network interface 113 is connected to the bus switch 251 via the connection 252, the storage product 102 can be configured as a host system of the external network interface 113.

For example, the processing device 107 can control the operations of the external network interface 113 in a way similar to the processing device 107 operating the internal network interface 113 in FIG. 9.

For example, the processing device 107 can communicate with the external network interface 113 to receive the incoming packets 202 and generate the storage access messages 151 from the incoming packets 202. Alternatively, the external network interface 113 has computing resources to convert the incoming packets 202 into the storage access messages 151. Thus, the processing device 107 can communicate with the external network interfaces 113 to receive the storage access messages 151.

When the storage product 102 has the response messages 226 and 228, the processing device 107 can communicate with the external network interface 113 to transmit the response messages 226 and 228. Alternatively, the processing device 107 converts the response messages 226 and 228 into outgoing packets 229 and communicates with the external network interface 113 to transmit the outgoing packets 229.

FIG. 10 illustrates an example of a connection 252 from the external network interface 113 to the bus switch 251 to access the random-access memory 101 and/or communicate with the processing device 107. Alternatively, a direct connection from the external network interface 113 to the processing device 107 can be provided to allow the processing device 107 to control and/or access the external network interface 113 without going through the bus switch 251, as in FIG. 11. In such implementations, the techniques discussed in connection with the internal network interface 113 in FIG. 1, FIG. 2, FIG. 4, FIG. 8, and FIG. 9 are applicable to the use of the external network interface 113 of FIG. 10.

FIG. 11 shows a storage product having a storage device, a bus connector to an external processor, and a bus connector to an external network interface according to one embodiment.

For example, the storage product 102 of FIG. 10 can be implemented in a way illustrated in FIG. 11 with message dispatching techniques illustrated in FIG. 5 and FIG. 8. The storage product 102 of FIG. 11 can be connected to a local host system 120 to process messages 205 and 227 using a storage application 215 as in FIG. 6, FIG. 7, and/or FIG. 8.

In FIG. 11, the storage product 102 has a bus switch 251 connecting bus connectors 104 and 159, a processing device 107 connected to a connection 252 through the bus connector 159 to an external network interface 113, a random-access memory 101, and a local storage device 105. For example, the bus switch 251 can selectively connected and disconnect some of the connections 253, 255, 257, and 259 to enable communications.

The processing device 107 can be used to communicate with the external network interface 113 to process incoming packets 202 from the computer network 114 and to transmit outgoing packets 229, in a way similar to the use of an internal network interface 113 in FIG. 1, FIG. 2, FIG. 4 and/or FIG. 9.

An external processor (e.g., a microprocessor, a local host system 120, or a processing device 118) can access a portion of the functions or circuits in the storage product 102 via the bus connector 104. The external processor can be programmed via instructions of the storage application 215 to control operations in the memory sub-system 110 by specifying a message selection configuration 201 for receiving messages 205 for processing, and by generating messages 209 for execution in the local storage device 105 and messages 228 for transmission by the network interface 113.

The random-access memory 101 can be accessible to the local host system 120 over a computer bus 125. For example, messages 205 to be processed by the local host system 120 and/or messages 209 to be transmitted to the storage device 105 can be buffered in the random-access memory 101.

The storage application 215 running in the local host system 120 can write the message selection configuration 201 into a predetermined location in the random-access memory 101. The processing device 107 of the memory sub-system 110 is configured to retrieve the message selection configuration 201 from the random-access memory 101. The processing device 107 is configured to identify messages 205 to be processed by the storage application 215 based on the criteria specified in the message selection configuration 201.

In some implementations, the message selection configuration 201 is communicated from the local host system 120 to the storage product 102 during a power up process of the local storage device 105. The processing device 107 can retrieve the message selection configuration 201 from the random-access memory 101 and then control message flows in the memory sub-system 110 according to the retrieved message selection configuration 201.

In some implementations, a predetermined portion of the random-access memory 101 is configured to store the message selection configuration 201 to control the processing device 107. The local host system 120 can dynamically change the message selection configuration 201 to control message flows.

In some implementations, a register file or a non-volatile memory of the memory sub-system 110 is configured to store the message selection configuration 201 that controls the message flows.

The local storage device 105 can provide the storage capacity 143 of the storage product 102 accessible over a computer network 114. For example, the local storage device 105 can have integrated circuit memory devices 130, . . . , 140 to provide the storage capacity 143. For example, the storage device 105 can be configured as a solid-state drive usable on a computer peripheral bus through its host interface 109. In some implementations, the storage device 105 is a solid-state drive (SSD) or a BGA SSD. In other embodiments, a hard disk drive can be used as the storage device 105.

The storage product 102 can be enclosed in a housing or casing 170 to protect the components of the memory sub-system 110. Access to functions of the components within the storage product can be limited to the use of the bus connectors 104 and 159. Since the resources of the memory sub-system 110 are designed to be sufficient to handle requests received according to the communication bandwidth of the network interface 113, the storage product 102 does not offer options for a user to customize its hardware (e.g., adding components, removing components, altering connections, etc.).

In some implementations, the network interface 113 includes a wireless transceiver for a wireless network connection.

In FIG. 11, the external network interface 113 is controlled by the processing device 107 (e.g., a logic circuit, a controller, or a processor). For example, the processing device 107 can be configured to process incoming packets 202 received by the external network interface 113 from the computer network 114 and to generate outgoing packets 229 for transmitting messages (e.g., response message 226 and 228) by the external network interface 113 into the computer network 114.

The processing device 107 is further configured to identify and separate messages for the local host system 120 and the storage device 105 according to the message selection configuration 201. A portion of messages received in the external network interface 113 from the computer network 114 is identified and provided to the local host system 120 for processing. For example, control messages 133 are identified and selected for processing by the local host system 120 in view of access control configuration data 141. For example, the processing device 107 connected to the external network interface 113 can buffer the messages 205 selected for processing by the local host system 120 in the random-access memory 101 (e.g., in one or more queues); and the local host system 120 can be configured (e.g., via an operating system 213 and/or a storage application 215) to retrieve the messages 205 to determine whether to accept or reject the requests in the retrieved messages 205, whether to transform the retrieved messages 205, and/or whether to generate new messages 209 for processing by the storage device 105 and/or the storage product 102.

The processing device 107 can forward the remaining messages received via the external network interface 113 from the computer network 114 (e.g., data messages 135) to the storage device 105 without the messages going through the local host system 120. In some implementations, the processing device 107 further selects a portion of the incoming storage access messages 151 and provides the selected messages 207 to the local storage device 105; and the remaining messages are discarded, rejected, or ignored as in FIG. 5.

Optionally, the storage product 102 can be configured to limit the access of the local host system 120 to processing the messages buffered in the random-access memory 101 by the processing device 107 of the network interface 113 and sending the processed or generated messages (e.g., control messages 137) to the storage device 105.

FIG. 11 illustrates an implementation where the external network interface 113 is connected to the processing device 107 without going through the bus switch 251. Alternatively, the bus connector 159 can be connected to the bus switch 251 in a same way as the other bus connector 104, as in FIG. 12. In such implementations, the bus connectors 104 and 159 can be configured to be interchanged in their connections to the external processor (e.g., local host system 120) and to the external network interface 113; and the storage product 102 can dynamically determine whether a bus connector (e.g., 104 or 159) is connected to a local host system 120 or a network interface 113.

FIG. 12 shows a storage product configured on a printed circuit board according to one embodiment.

For example, the storage product 102 of FIG. 10 can be implemented in a way illustrated in FIG. 12 with a message dispatching technique illustrated in FIG. 5 and FIG. 8. The storage product 102 of FIG. 12 can be connected to a local host system 120 to process messages using a storage application 215 as in FIG. 6, FIG. 7, and/or FIG. 8.

Similar to FIG. 11, the storage product 102 in FIG. 12 has a bus switch 251 connecting bus connectors 104 and 159 via connections 255 and 252, a processing device 107 via a connection 253, a random-access memory 101 via a connection 257, and a storage device 105 via a connection 259.

In some implementations, the bus connectors 104 and 159 are interchangeable in their usages for connecting the local host system 120 and the network interface 113. The storage product 102 can dynamically adapt communications to the local host system 120 and the network interface 113 through the bus connectors 104 and 159.

In some implementations, the external network interface 113 can be replaced with another local host system that has a network interface attached to its computer bus that is separate from the computer bus 125 of the local host system 120 configured to process messages 205 selected according to the host selection criteria 217. The other local host system having the network interface can be used to process incoming packets 202 and transmit outgoing packets 229, and optionally performing pre-processing for messages to the storage product 102 and/or post-processing for response messages from the storage product 102.

Optionally, the storage product 102 can be configured in the form of an expansion card built on a printed circuit board 108. A portion of the printed circuit board 108 can be configured as the bus connector 104 for the external processor (e.g., local host system 120). For example, the bus connector 104 can be inserted into an expansion slot on a computer bus 125 for connection to a local host system 120.

Optionally, both the bus connectors 104 and 159 can be configured as portions of the printed circuit board 108. Either of the bus connectors 104 and 159 can be inserted into an expansion slot on the computer bus 125.

Alternatively, the bus connector 104 is configured to be inserted into an expansion slot; and the bus connector 159 is configured to a port accept a bus cable for a connection to the external network interface 113.

Alternatively, the bus connector 104 is configured to be inserted into an expansion slot; and the bus connector 159 is configured as an expansion slot so accept an external network interface 113 in the form of an expansion card.

Alternatively, both the bus connectors 104 and 159 can be configured as ports for accepting bus cables for connection to the local host system 120 and the external network interface 113.

In FIG. 11 and FIG. 12, the connection 255 from the bus switch 251 can be connected to the computer bus 125 via the bus connector 104. The connection 252 from the bus switch 251 can be connected to the external network interface 113 via the other bus connector 159. In some implementations, the computer bus 125 and the connections 252, 253, 257, 258 and 259 to the bus switch 251 use different protocols; and a host interface 112 can be connected between the bus connector 104 and the bus switch 251 to perform protocol conversion.

In FIG. 12, the memory sub-system 110 has a processing device 107 that is separate from the network interface 113. The processing device 107 and the network interface 113 can communicate with each other over the bus switch 251 to process packets to generate messages (e.g., control messages 133 and data messages 135) and to transmit messages (e.g., response messages 155).

In FIG. 12, the processing device 107 (e.g., a processor or controller) can be programmed to perform operations independent of the local host system 120. The processing device 107 is configured to identify messages 205 according to the message selection configuration 201 and place the messages 205 in the random-access memory 101 for processing by the local host system 120. After the local host system 120 places its output messages 209 in the random-access memory 101, the processing device 107 is further configured to forward the messages 209 to the storage device 105. Thus, the control and access by the local host system 120 can be limited to the random-access memory 101 and the message selection configuration 201.

In some implementations, the processing device 107 and the network interface 113 have a direct communication connection 252 not accessible to other components of the storage product 102 as in FIG. 11.

In FIG. 12, the bus switch 251 can provide multiple channels for communications among the components of the memory sub-system 110 and the local host system 120.

For example, when the bus switch 251 joins the connections 252 and 253 to connect the network interface 113 with the processing device 107 to receive storage access messages 151 or transmit response messages 226 and 228, the bus switch 251 can join connection 255 to the connection 257 to the random-access memory 101, or the connection 259 to the local storage device 105, for the local host system 120 to access the message 205 selected for processing by the local host system 120, or for the local host system 120 to provide the storage product 102 with its generated messages 209.

For example, when the bus switch 251 joins the connections 252 and 253, the bus switch 251 can also join the connections 259 and 257 to allow the local storage device 105 to retrieve the messages 209 generated in the random-access memory 101 by the local host system 120 and/or to buffer the response messages 227 into the random-access memory 101 for processing by the local host system 120.

For example, when the bus switch 251 joins the connections 253 and 257 for the processing device 107 to buffer messages 205 into, or retrieve messages 228 from, the random-access memory 101, the bus switch 251 can join the connections 255 and 259 to allow the local host system 120 to access the local storage device 105.

For example, when the bus switch 251 joins the connections 253 and 259 for the processing device 107 to communicate with the local storage device 105 directly, the bus switch 251 can also join the connections 255 and 257 for the local host system 120 to access the random-access memory 101.

Optionally, the printed circuit board 108 also has a casing or housing 170 configured to substantially enclose the components of the memory sub-system 110 to prevent tampering.

FIG. 11 and FIG. 12 illustrate examples of one storage device 105 being connected to the bus switch 251 of the memory sub-system 110. Optionally, multiple storage devices 105 are configured in the memory sub-system 110 to operate in parallel to match the bandwidth of the network interface 113.

Figure 13:
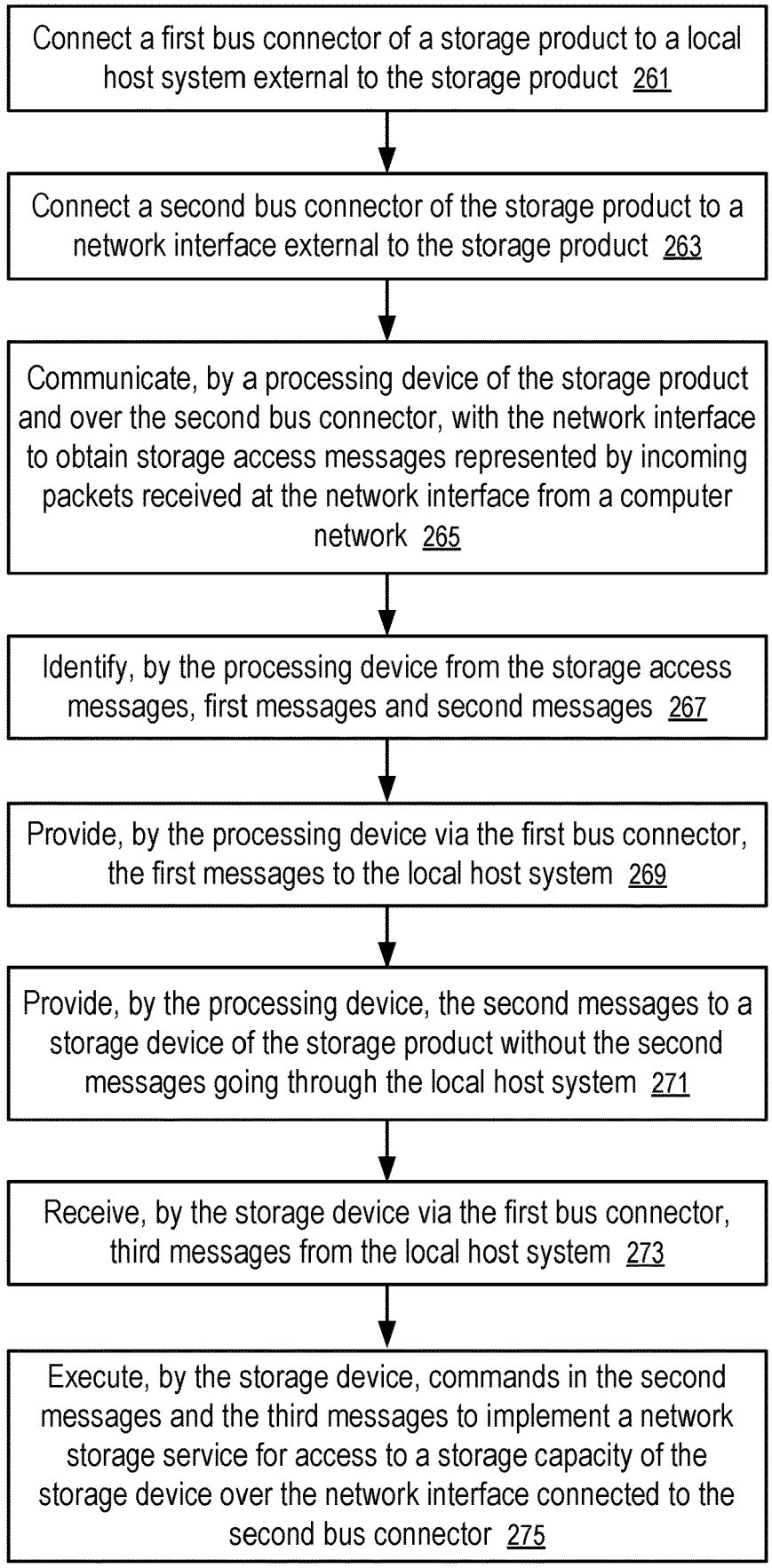
FIG. 13 shows a method to provide network storage services using a storage product, an external processor, and an external network interface according to one embodiment.

FIG. 13 shows a method to provide network storage services using a storage product, an external processor, and an external network interface according to one embodiment.

For example, the method of FIG. 13 can be performed by a storage manager configured in a memory sub-system 110 of a storage product 102 and/or a local host system 120 of FIG. 10, FIG. 11 and/or FIG. 12 to have different processing paths illustrated in FIG. 2 using techniques of FIG. 5 and FIG. 8. For example, a storage manager in the memory sub-system 110 can be implemented to perform operations discussed in connection with the memory sub-system 110; and the storage manager can be implemented via a logic circuit and/or a processing device 117 of the memory sub-system controller 115, and/or instructions programmed to be executed by the processing device 117. For example, a storage manager (e.g., storage application 215) in the local host system 120 can be implemented to perform operations discussed in connection with the local host system 120; and the storage manager can be implemented via a logic circuit and/or a processing device 118 of the host system 120, and/or instructions programmed to be executed by the processing device 118.

At block 261, a first bus connector 104 of a storage product 102 connects the storage product 102 to a local host system 120 external to the storage product 102.

At block 263, a second bus connector 159 of the storage product 102 connects the storage product 102 to a network interface 113 external to the storage product 102.

For example, the storage product 102 can be manufactured and shipped from a manufacturer as a standalone computer component to be installed in a computer device. To construct a computing device to offer a network storage service, the storage product 102 is to be connected to a local host system 120 via the first bus connector 104 and to a network interface 113 via the second bus connector 104. The storage product 102 is configured between the local host system 120 and the network interface 113 to separate them such that no communications between them bypass the storage product 102.

For example, the storage product 102 can have a processing device 107, a random-access memory 101, and a local storage device 105 to provide a network storage service over the network interface 113. The local host system 120 can be used to control access and/or perform administrative operations for the network storage service. At least a portion of the storage capacity 143 of the storage device 105 can be accessible via the network interface 113 to a remote host system 121 over a computer network 114.

For example, the storage product 102 includes a printed circuit board 108 having traces. The processing device 107, the random-access memory 101, the storage device 105 are connected to the traces on the printed circuit board 108. A portion of the printed circuit board 108 can be configured as the first bus connector 104 insertable into an expansion slot on a mother board to connect to a computer bus 125 of the local host system 120.

Optically, the storage product 102 is enclosed with a casing or housing 170; and the logic, processing, and storage functions of the storage product 102 are designed to be access via the bus connectors 104 and 159.

Optionally, the first bus connector 104 and the second bus 159 connector are interchangeable for connection to the local host system 120 and are interchangeable for connection to the network interface 113. For example, instead of connecting the first bus connector 104 and the second bus connector 159, the storage product 102 is also operable when the local host system 120 is connected to the second bus connector 159, while the network interface 113 is connected to the first bus connector 104.

In some implementations, when the second bus connector 159 is connected to the network interface 113, the storage product 102 and/or its processing device 107 can function as a host of the external network interface 113. Optionally, the storage product 102 and/or its processing device 107 can use the external network interface 113 in a same way as the memory sub-system 110 of FIG. 1, FIG. 4, and/or FIG. 9 using its internal network interface 113.

For example, the storage product 102 can have a direct connection 252 from the processing device 107 to the external network interface 113 (e.g., as in FIG. 11) in a way similar to an internal network interface 113 being connected to a processing device 107 of a memory sub-system 110.

For example, the storage product 102 can have a connection 252 from a bus switch 251 to the external network interface 113 (e.g., as in FIG. 10) in a way similar to an internal network interface 113 being connected to a bus switch 251 of a memory sub-system 110.

For example, the bus switch 251 can have a connection 252 to the network interface 113, a connection 253 to the processing device 107, a connection 255 to the local host system 120, a connection 257 to the random-access memory 101, and/or a connection 259 to the local storage device 105. The bus switch 251 can join two of the connections 252, 253, 255, 257, and 259 to provide a functioning bus between two components used by the storage product 102. Optionally, the bus switch 251 can provide two concurrent functioning buses between two pairs of components used by the storage product 102.

Alternatively, when the second bus connector 159 is connected to the network interface 113, a portion of the storage product 102 and/or its random-access memory 101 can be configured as a peripheral of the external network interface 113; and the external network interface 113 can operate as a host of the portion of the storage product 102 (e.g., by writing data into and reading data from the random-access memory 101).

In some implementations, the external network interface 113 can be replaced with a separate local host system having a processing device and a network interface connected to a computer bus (e.g., separate from the computer bus 125, and separate from the local host system 120). The second bus connector 159 can be connected to the computer bus to receive network services.

At block 265, a processing device 107 of the storage product 102 communicates, over the second bus connector 159, with the external network interface 113 to obtain storage access messages 151 represented by incoming packets 202 received at the network interface 113 from a computer network 114.

For example, the external network interface 113 (or a local host system containing the external network interface 113) can function as a host of the random-access memory 101 of the storage product and buffers the incoming packets 202 into the random-access memory 101 for converting to the storage access messages 151 by the processing device 107. Alternatively, the external network interface 113 (or a local host system containing the external network interface 113) can generate the storage access messages 151 from the incoming packets 202 and buffers the storage access messages 151 into the random-access memory 101 for processing by the processing device 107 of the storage product 102.

For example, the processing device 107 can function as a host of the external network interface 113 and communicate with the external network interface 113 to convert the incoming packets 202 into the storage access messages 151.

At block 267, the processing device 107 identifies, from the storage access messages 151, first messages 205 and second messages 207.

For example, the processing device 107 can be preconfigured to identify control messages 133 as the first messages 205 and data messages 135 as the second messages 207.

For example, the local host system 120 can configure (e.g., based on user inputs received in its user interface 211) the message selection configuration 201 by specifying host selection criteria 217 and local selection criteria 219. A portion of the storage access messages 151 can be selected according to the host selection criteria 217 as the first messages 205; and another portion of the storage access messages 151 can be selected according to the local selection criteria 219 as the second messages 207.

At block 269, the processing device 107 provides, via the first bus connector 104, the first messages 205 to the local host system 120.

For example, the bus switch 251 can join connections 253 and 257 to provide a functioning bus between the processing device 107 and the random-access memory 101 to allow the processing device 107 to buffer the first messages 205 into the random-access memory 101 for retrieval by the local host system 120. The bus switch 251 can join connections 255 and 257 to provide a functioning bus between the local host system 120 and the random-access memory 101 to allow the local host system 120 to retrieve the first messages 205 from the random-access memory 101.

At block 271, the processing device 107 provides the second messages 207 to a storage device 105 of the storage product 102 without the second messages 207 going to and/or through the local host system 120.

For example, the first messages 205 are selected for processing by the local host system 120 to allow the local host system to apply control; and the second messages 207 are selected for internal processing within the storage product 102 without the second messages 207 being communicated to the local host system 120 to reduce the computing resource requirements and/or communication bandwidth requirements for the local host system 120. Thus, the local host system 120 can be used with multiple storage products (e.g., 102) to easily scale up the storage capacity controlled via the local host system 120.

For example, the storage device 105 can have a local memory 119. The bus switch 251 can join the connections 253 and 259 to provide a functioning bus to allow the processing device 107 to buffer the second messages 207 directly into the local memory 119 (instead of into the random-access memory 101).

At block 273, the storage device 105 receives, via the first bus connector 104, third messages 209 from the local host system 120.

For example, the local host system 120 can generate the third messages 209 responsive to the first messages 205 and/or user inputs in the user interface 211 and in view of access control configuration data 141. The local host system 120 provides the third messages 209 to the storage product 102 to implement security measures, apply access control, perform message transformation, set up access channel, etc.

For example, the storage device 105 can have a local memory 119. The bus switch 251 can join the connections 255 and 259 to provide a functioning bus to allow the local host system 120 to buffer the third messages 209 directly into the local memory 119 (instead of into the random-access memory 101).

At block 275, the storage device 105 executes commands in the second messages 207 and the third messages 209 to implement a network storage service for access to a storage capacity 143 of the storage device 105 over the network interface 113 connected to the second bus connector 159.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special-purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special-purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a storage manager configured to implement the functions discussed above. In some embodiments, the controller 115 in the memory sub-system 110 includes at least a portion of the storage manager. In other embodiments, or in combination, the controller 116 and/or the processing device 118 in the host system 120 includes at least a portion of the storage manager. For example, the controller 115, the controller 116, and/or the processing device 118 can include logic circuitry implementing the storage manager. For example, the controller 115, or the processing device 118 (processor) of the host system 120, can be configured to execute instructions stored in memory for performing the operations of the storage manager described herein. In some embodiments, the storage manager is implemented in an integrated circuit chip disposed in the memory sub-system 110. In other embodiments, the storage manager can be part of firmware of the memory sub-system 110, an operating system of the host system 120, a device driver, or an application, or any combination therein.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations of a storage manager (e.g., to execute instructions to perform operations corresponding to operations described with reference to FIG. 1-FIG. 13). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory sub-system 110 of FIG. 1.

In one embodiment, the instructions include instructions to implement functionality corresponding to a storage manager (e.g., the operations described with reference to FIG. 1 to FIG. 13). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A storage product, comprising:
   a first bus connector operable to be connected to a local host system external to the storage product;
   a second bus connector operable to be connected to a network interface external to the storage product;
   a storage device having a storage capacity accessible via a network storage service over the network interface connected to the second bus connector; and
   a processing device configured to communicate, via the second bus connector, with the network interface to obtain storage access messages represented by incoming packets received at the network interface from a computer network;
   wherein the processing device is further configured to:
      identify, from the storage access messages, first messages and second messages;
      provide, the first messages via the first bus connector, to the local host system; and
      provide, the second messages, to the storage device without going through the local host system; and
   wherein the storage device is configured to:
      receive, via the first bus connector, third messages from the local host system; and
      execute commands in the second messages and the third messages to implement the network storage service.

2. The storage product of claim 1, further comprising:
   a random-access memory;
   wherein the processing device is configured to provide the first messages to the local host system via buffering the first messages in the random-access memory for retrieval by the local host system.

3. The storage product of claim 2, wherein the storage device comprises a local memory; and the storage device is configured to receive the third messages via the local host system buffering the third messages into the local memory without buffering the third messages in the random-access memory.

4. The storage product of claim 3, wherein the processing device is configured to provide the second messages to the storage device via buffering the second messages into the local memory without buffering the second messages into the random-access memory.

5. The storage product of claim 1, wherein the first bus connector and the second bus connector are interchangeable for connection to the local host system and are interchangeable for connection to the network interface.

6. The storage product of claim 1, further comprising:
a printed circuit board having traces;
wherein the processing device and the storage device are connected to the traces; and
wherein a portion of the printed circuit board is configured as the first bus connector insertable into an expansion slot on a mother board to connect to a computer bus of the local host system.

7. The storage product of claim 1, wherein the storage product is manufactured and shipped as a computer component to be installed in a computer system.

8. The storage product of claim 1, wherein the processing device has a connection to the second bus connector to function as a host of the network interface when the second bus connector is connected to the network interface.

9. The storage product of claim 1, wherein when the network interface is connected to the second bus connector, the network interface is configured as a host of at least a portion of the storage product.

10. The storage product of claim 9, further comprising:
a random-access memory;
wherein the portion includes a portion of the random-access memory usable by the network interface to buffer incoming packets received from a computer network or the storage access messages for retrieval by the processing device.

11. The storage product of claim 10, wherein the local host system and the network interface have no communications that bypass the storage product.

12. A method, comprising:
connecting a first bus connector of a storage product to a local host system external to the storage product;
connecting a second bus connector of the storage product to a network interface external to the storage product;
communicating, by a processing device of the storage product and over the second bus connector, with the network interface to obtain storage access messages represented by incoming packets received at the network interface from a computer network;
identifying, by the processing device from the storage access messages, first messages and second messages;
providing, by the processing device via the first bus connector, the first messages to the local host system;
providing, by the processing device, the second messages to a storage device of the storage product without the second messages going through the local host system;
receiving, by the storage device via the first bus connector, third messages from the local host system; and
executing, by the storage device, commands in the second messages and the third messages to implement a network storage service for access to a storage capacity of the storage device over the network interface connected to the second bus connector.

13. The method of claim 12, wherein the storage product is manufactured and shipped as a computer component to be installed in a computer system.

14. The method of claim 13, further comprising:
buffering, by the processing device, the first messages into a random-access memory of the storage product for retrieval by the local host system.

15. The method of claim 14, further comprising:
connecting, by the storage product, the local host system to the storage device for the local host system to buffer the third messages into a local memory of the storage device without the third messages being buffered in the random-access memory.

16. The method of claim 15, further comprising:
buffering, by the processing device, the second messages into the local memory of the storage device.

17. The method of claim 12, further comprising:
configuring, in response to the second bus connector being connected to the network interface, the processing device as a host of the network interface.

18. The method of claim 12, further comprising:
configuring, in response to the second bus connector being connected to the network interface, the network interface as a host of a random-access memory of the storage product to provide the network interface with access to buffer the storage access messages or the incoming packets in the random-access memory for retrieval by the processing device.

19. A computing device, comprising:
a computer bus;
a processor connected to the computer bus;
a network interface operable on a computer network; and
a storage product manufactured as a standalone computer component, the storage product comprising:
a first bus connector connected to the computer bus external to the storage product;
a second bus connector connected to the network interface external to the storage product;
a random-access memory;
a storage device having a storage capacity accessible via a network storage service over the network interface connected to the second bus connector; and
a processing device configured to communicate, via the second bus connector, with the network interface to obtain storage access messages represented by incoming packets received at the network interface from the computer network;
wherein the processing device is further configured to:
identify, from the storage access messages, first messages and second messages;
provide, the first messages via the first bus connector and the random-access memory, to the processor external to the storage product; and
provide, the second messages, to the storage device without going through the processor;
wherein the processor is configured to:
generate, responsive at least in part to the first messages, third messages; and
provide, via the first bus connector, the third messages to the storage device; and
wherein the storage device is configured to execute commands in the second messages and the third messages to implement the network storage service.

20. The computing device of claim 19, wherein the storage product further comprises a bus switch configured to selectively connect the first bus connector, the second bus connector, the storage device, the processing device, and the random-access memory.

\* \* \* \* \*